(12) United States Patent
Haas et al.

(10) Patent No.: US 7,956,809 B2
(45) Date of Patent: Jun. 7, 2011

(54) METHOD AND DEVICE FOR DETERMINING THE SPEED OF A MOVING ENTITY

(75) Inventors: Harald Haas, Edinburgh (GB); Mostafa Zaman Afgani, Edinburgh (GB); Stéphane Beauregard, Bremen (DE)

(73) Assignee: MobilTec

( * ) Notice: Subject to any disclaimer, the term of this patent is extended or adjusted under 35 U.S.C. 154(b) by 0 days.

(21) Appl. No.: 12/160,739

(22) PCT Filed: Dec. 8, 2006

(86) PCT No.: PCT/EP2006/011853
§ 371 (c)(1),
(2), (4) Date: Mar. 27, 2009

(87) PCT Pub. No.: WO2007/079866
PCT Pub. Date: Jul. 19, 2007

(65) Prior Publication Data
US 2009/0189813 A1 Jul. 30, 2009

(30) Foreign Application Priority Data
Jan. 11, 2006 (EP) .................................... 06000446

(51) Int. Cl.
*G01S 3/02* (2006.01)
*G01S 13/58* (2006.01)

(52) U.S. Cl. ........................................ 342/461; 342/107

(58) Field of Classification Search .................. 342/107, 342/118, 444, 461, 463, 465
See application file for complete search history.

(56) References Cited

U.S. PATENT DOCUMENTS

| | | | |
|---|---|---|---|
| 3,366,960 | A | 1/1968 | Gluck |
| 4,131,891 | A | 12/1978 | Stavis |
| 5,585,805 | A | 12/1996 | Takenaka et al. |
| 2004/0082331 | A1 | 4/2004 | Peng |

FOREIGN PATENT DOCUMENTS

| | | |
|---|---|---|
| DE | 35 43 339 | 11/1987 |
| EP | 1 471 365 | 10/2004 |
| JP | 4-157388 | 5/1992 |

*Primary Examiner* — Dao L Phan
(74) *Attorney, Agent, or Firm* — Sunstein Kann Murphy & Timbers LLP

(57) ABSTRACT

A method and a corresponding device determines the speed of a moving entity carrying at least two antennas for receiving a transmission signal the antennas being displaced at a predetermined distance. In order to provide a more simple and accurate method which can be used with different transmission signals the method includes the steps of: receiving a transmission signal by the antennas, determining signal characteristics from the transmission signal as received by the determining a time offset between the reception of the transmission signal at the antennas by comparing the signal characteristics determined for the antennas, and determining the speed of the moving entity from the determined time offset, the distance of the antennas and the direction of movement of the moving entity relative to the arrangement of the antennas.

20 Claims, 16 Drawing Sheets

METHOD AND DEVICE FOR DETERMINING THE SPEED OF A MOVING ENTITY

TECHNICAL FIELD

The present invention relates to a method and a corresponding device for determining the speed of a moving entity, such as a vehicle, a mobile phone or any other moving device, whose speed might be of interest.

BACKGROUND ART

Known mobile speed estimation algorithms can be briefly grouped into two categories: time-domain approaches, e.g. based on the covariance approximations on the envelope level crossing rates (LCR) or average fade duration, and frequency-domain approaches based on the Doppler spectrum or on some parametric spectral analysis. Such methods for speed estimation include estimating the maximum Doppler frequency using spectrum methods, calculating the squared deviations of the logarithmically compressed received envelope, zero-crossing estimators, frequency domain time covariance analysis and wavelet-based approaches. These methods give generally good results at vehicular speeds (larger than 30 km/h). However, these algorithms are quite complicated and they do not work satisfactorily at very low speeds (e.g. pedestrians speeds up to 6 km/h).

JP 04-157388 A2 discloses a method and device for measuring at least one of acceleration, speed and moving distance of a moving body by determining a phase difference between standing waves of the same frequency which are received simultaneously by two antennas provided along the direction of movement of the moving body. A standing wave of a half wavelength formed in a space by an FM radio wave emitted from an FM station is received by the antennas. The rear antenna (in the direction of movement) receives the wave in a time delay compared to the front antenna. By correlative processing the time delay is calculated wherefrom the ground speed of the moving body is calculated.

SUMMARY OF EMBODIMENTS

It is an object of the present invention to provide a method and device for determining the speed of a moving entity which is much simpler than known methods, delivers accurate speed estimates also for very slow moving entities, such as mobile terminals carried by pedestrians, and which is not restricted to the use of a standing FM radio wave emitted from an FM station.

The object is achieved according to the present invention by a method as defined in claim 1 where the moving entity carries at least two antennas for receiving a transmission signal, said antenna is being displaced at a predetermined distance, said method comprising the steps of:
  receiving a transmission signal by the at least two antennas,
  determining signal characteristics from the transmission signal as received by the at least two antennas,
  determining a time offset between the reception of the transmission signal at the at least two antennas by comparing the signal characteristics determined for the at least two antennas, and
  determining the speed of the moving entity from the determined time offset, the distance of the at least two antennas and the direction of movement of the moving entity relative to the arrangement of the at least two antennas.

A corresponding device for determining the speed of a moving entity. The present invention relates further to a moving entity, in particular a mobile phone, a navigation system, a computer, a PDA, a vehicle or a piece of clothing, including a device for determining the speed of the moving entity. Still further, the present invention relates to a computer program comprising program code means for causing a computer to carry out the steps of the method according to the present invention when the computer program is run on a computer.

The invention is based on the idea to measure a transmission signal, which can generally be any signal transmitted over the air and that is available for other purposes, such as transmission signals of a wireless communication system or of a broadcast system, by the at least two antennas and to determine signal characteristics therefrom. Based on these signal characteristics, which can, for instance, be the signal strength, signal phase or a signal envelope, the transmission signals measured by the at least two antennas are compared, and it is particularly determined with which time offset the transmission signal is received by the at least two antennas. Knowing this time offset and knowing the predetermined distance at which the at least two antennas are displaced, it is then possible to determine the speed of the moving entity by a simple calculation, generally by a simple function including only a division of said predetermined distance by the determined time offset.

It shall be noted that according to the present invention it is not mandatory that the transmission signal is received by at least two antennas simultaneously or at the same time, but—depending on the particular embodiment or application—the transmission signal can also be received by different antennas subsequently or at different moments in time.

It is generally known that due to reflection, refraction and scattering effects, the strength of a signal received at a moving receiver can vary considerably over time. As the receiver moves, the strength and phase of incoming multipath radio waves change and consequently different patterns of constructive and destructive interference are formed at the receiving antenna. The interference patterns will be relatively stable in space if the radio propagation environment does not change significantly, i.e. if the transmitter and scatterers in the immediate vicinity do not move. The sum of the incoming signals gives rise to random fluctuations in the received signal strength (RSS) on the order of a wavelength. Hence, in a preferred embodiment envelope signals are determined for the transmission signals received by the at least two antennas which are then used as the signal characteristics. For instance, the determined envelope signals are recorded and time stamped from all antennas. Since the at least two antennas generally see virtually identical RSS fading patterns but just offset in time, the time offset will be proportional to the distance between the antennas and inversely proportional to the speed of the moving entity.

In particular when using envelope signals (or RSS measurements) a simple pattern matching method is used in a preferred embodiment giving an estimate of the temporal offset between the measured and recorded patterns. This is preferably done in real-time after each new transmission signal measurement is made. In addition, preferably standard time warping techniques are used to align the measurement patterns if large accelerations are experienced. Odometry or cumulative distance estimates are then given simply by numerical integration of the speed estimate.

In a preferred embodiment the moving entity carries two antennas, preferably arranged along a line parallel to the direction of regular movement of said moving entity, wherein for each antenna signal characteristics are determined from the received transmission signal and wherein the determined signal characteristics are compared to determine said time offset. This is the most simple embodiment for implementing the invention which, however, only allows the determination of the speed of the moving entity.

In another embodiment the moving entity carries a plurality of antennas, preferably arranged in a common plane or a common sphere, wherein for each antenna signal characteristics are determined from the received transmission signal and wherein the signal characteristics are compared to determine the time offsets between the reception of the transmission signal at the plurality of antennas. With this embodiment in addition to the speed also the direction of movement can be determined from a comparison of the time offsets at which the transmission signal is received by the plurality of antennas. Furthermore, a plurality of antennas allows a more accurate determination of the speed compared to the use of only two displaced antennas.

Advantageously, the antennas of said plurality are arranged at the corners of a polygon having equally long side lengths, at equal distances along the circumference of a circle or equispaced on the surface of a sphere, which simplifies the determination of the time offsets and, if desired, the direction of movement.

The comparison of the signal characteristics can be performed continuously so that all the time the current speed is available. Alternatively said comparison can be performed from time to time, for instance at regular intervals. In a preferred embodiment thereof signal characteristics determined from a portion of the signal as received by the antenna located foremost in movement direction are stored as reference characteristics and wherein the same signal characteristics are determined from the transmission signals received by the other antennas and compared to the reference characteristics to determine the time offset(s).

As mentioned above, signal characteristics of such a signal portion could be the RSS fading pattern of an envelope signal so that a simple pattern matching algorithm is used for comparison. However, generally many different signal characteristics can be exploited by the present invention, such as amplitude peak values, energy values, delay, multipath delay characteristics, maximum delay, root-means-square (RMS) of delay, maximum Doppler frequency, Doppler spectrum or spectral characteristics of the transmission signal.

In particular, when using an envelope signal as signal characteristic, a portion of the envelope signal determined from the transmission signal received by the antenna located foremost in movement direction is stored as reference portion and the other envelope signals are compared to this reference portion to determine the time offset(s).

As mentioned above when using more than two antennas and exploiting the transmission signals received by such a plurality of antennas the direction of movement of the moving entity can be determined. However, in an alternative embodiment the direction of movement relative to the arrangement of the at least two antennas is determined by use of direction measurement means, in particular a navigation system or an acceleration sensor. The determined direction can then be used to align the at least two antennas with the direction of movement of the moving entity so that always or at least just before the transmission signals for determining the speed are received by the at least two antennas are essentially at the same position with respect to the moving entity. For instance, in the embodiment having only two antennas it can be foreseen that the antennas are always on-the-fly aligned such that they are positioned on a line parallel to the direction of movement, i.e. if said direction changes also the position of the antennas is corrected accordingly.

According to a further embodiment based on an RFSM (Radio Frequency Signature Matching) based approach of the present invention, which is easy to implement and which delivers reliable speed estimates also for low velocities, comprises the steps of:
  determining one or more channel frequency response signals based on the received transmission signal by the antenna located foremost in movement direction,
  storing said one or more channel frequency response signals,
  determining a current channel frequency response signal based on the received transmission signal by at least one of the antennas, which are not located foremost in movement direction,
  correlating the current channel frequency response signal with at least one of the stored channel frequency response signals to determine said time offset.

Preferably for simplifying the calculations the at least two antennas are identical.

Different transmission signals can be exploited by the present invention, such as transmission signals of a wireless communication system, in particular of a GSM, UMTS, WiMax, WiFi system, or of a digital broadcast system, such as a DVB-T system.

BRIEF DESCRIPTION OF THE DRAWINGS

The invention will now be explained in more detail with reference to the drawings in which.

DETAILED DESCRIPTION OF SPECIFIC EMBODIMENTS

Figure 1:
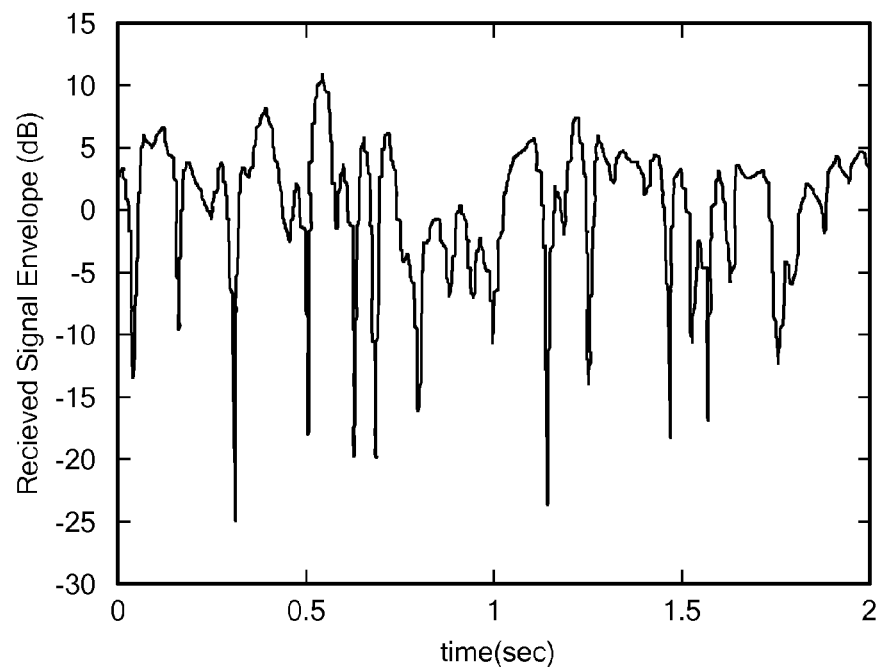
FIG. 1 shows an envelope signal of a received transmission signal.

FIG. 1 shows a typical envelope signal of a transmission signal received by an antenna adapted for reception of said transmission signal. The strength and phase of incoming multipath radio waves change due to reflection, refraction and scattering effects and due to movement of the receiving antenna so that different patterns of constructive and destructive interference are formed there. However, if the radio propagation environment does not change significantly, at least in a certain time interval, the interference patterns will be relatively stable. The sum of signals received by an antenna under these assumptions, called envelope signal, thus shows random fluctuations in the received signal strength and fast fading effects as shown in the example of FIG. 1. If a constant speed of the antenna is assumed, the horizontal axis (time axis) can be converted to a spatial position.

Figure 2:
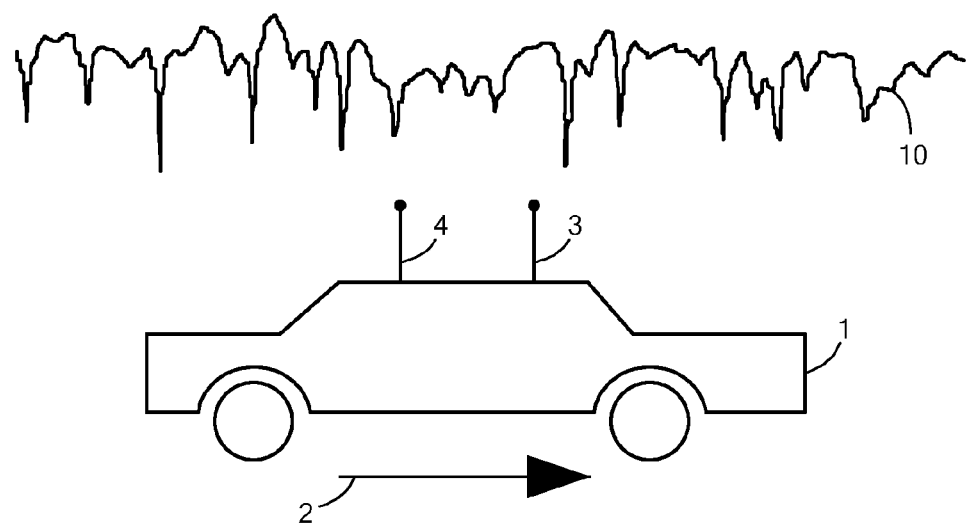
FIG. 2 shows a diagram illustrating one embodiment for use of the invention.

A simple configuration of an example for use of the invention is illustrated in FIG. 2. In this example the speed of the vehicle 1 shall be determined, said vehicle moving at present to the right-hand side in forward direction as indicated by arrow 2. At a known distance apart and aligned with the direction 2 of motion of the vehicle 1, such as a car, two antennas are fixed, i.e. a front antenna 3 and a rear antenna 4, on the roof. As the vehicle 1 moves the transmission signal 10 is received, recorded and time stamped from both the front and rear antennas 3, 4, for instance in finite length first-in first-out FIFO buffers. The two antennas 3, 4 will see virtually identical RSS fading patterns, but just offset in time due to the displacement of the two antennas 3, 4 in movement direction 2. This offset in time is determined by comparing the two measured and recorded RSS measurements. In particular, signal characteristics of the received transmission signal 10 are determined, such as an envelope signal, or at least characterising portions of such envelope signal, and these signal characteristics are used to correlate the transmission signals received by the two antennas 3, 4. Therefrom the time offset is calculated from which the speed of the vehicle 1 can be easily determined, as the speed is proportional to the (known) distance between the antennas 3, 4 and inversely proportional to the calculated time offset.

Figure 3:
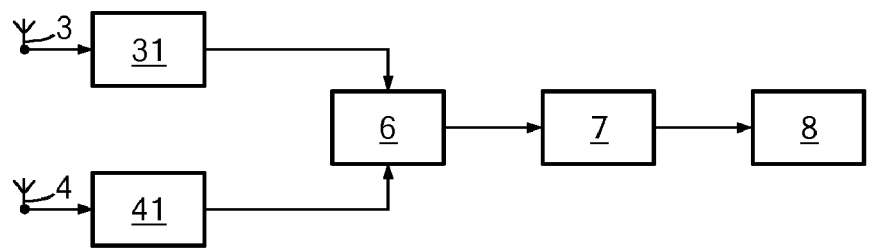
FIG. 3 shows a schematic block diagram of a first embodiment of a device according to the present invention using two antennas.

A schematic block diagram of a device for determining the speed of the vehicle 1 using two antennas as illustrated in FIG. 2 is shown in FIG. 3. As shown there for each of the antennas 3, 4 a signal characteristics determination unit 31, 41 is provided which are essentially identical and determine the same type of signal characteristics from the transmission signal provided from the respective antenna 3, 4. In a comparison unit 6 the determined signal characteristics are compared. In particular, a pattern matching technique is applied there in order to find matching patterns determined as signal characteristics from the transmission signals. If matching patterns have been found the time offset between the reception of the transmission signals by the two antennas 3, 4 is determined in a time offset determination unit 7 which is generally possible in a simple way since the signal characteristics are time stamped or at least a time index is available for the signal characteristics. Once the time offset is known the speed can be easily determined in a speed determination unit 8 as described above.

According to this embodiment the speed determination can be improved by using the multiple sub-carriers that are found in certain wireless communication systems, such as DVB-T, 802.11b/b, WiMax. In this case the speed determination derived from all the sub-carriers can be averaged for greater accuracy. According to another embodiment, which will be explained below, the wide bandwidth (displaying frequency selective fading) provides higher resolution frequency response data which is better for signature matching.

The method according to the present invention is far simpler than speed estimates based on single-antenna RSS measurements. It requires only simple memory means, such as FIFO-buffers (which are, for instance, included in the signal characteristics determination units 31, 41 of the embodiment shown in FIG. 3) and very simple comparisons such as pattern alignment algorithms.

Speed estimates for pedestrian speeds (indoor and outdoor) are thus possible and give better results than known methods. Compared to the method known from JP04-157388 A2 the present invention is not restricted to the use of standing FM radio waves emitted from an FM station, said FM radio waves having a fixed frequency and wavelength to which the distance of the antennas in the known embodiment must be adopted. The method according to the present invention can be used with many different types of transmission signals and allows to freely set the distance of the antennas which is particularly important if the moving entity is much smaller than a vehicle so that the distance can not be adopted to the wavelength of an FM radio wave as is required by the known method. Furthermore no standing waves having a fixed frequency wavelength are required, in particular if pattern matching techniques are used for comparison of these signal characteristics. Hence, different applications are possible with the present invention, in particular the use of more than two antennas which allow not only the determination of the speed but also of the direction of movement as will be explained below.

Figure 4:
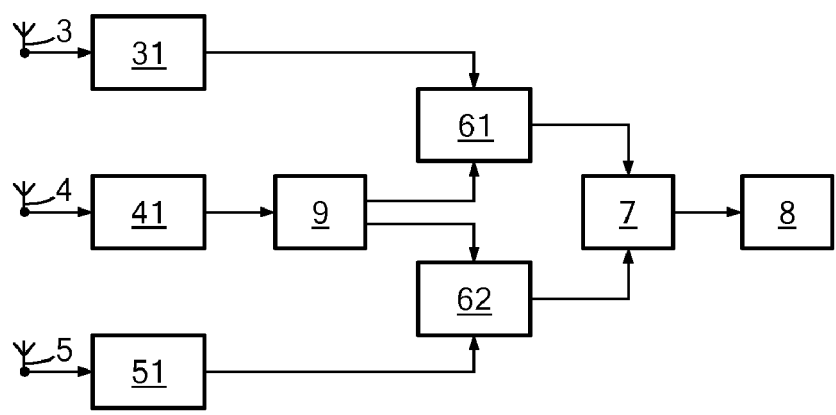
FIG. 4 shows a schematic block diagram of an embodiment of a device according to the present invention using a plurality of antennas.

FIG. 4 shows a schematic block diagram of an embodiment of a device according to the present invention using a plurality (i.e. more than two) of antennas. Just as an example three antennas 3, 4, 5 are shown; in practise, more than three, such as four, eight or sixteen antennas can be easily used. For each transmission signal as received from the antennas 3, 4, 5 signal characteristics are determined in determination units 31, 41, 51. In this embodiment the signal characteristics as determined from the transmission signal of antenna 4 are stored in a storage unit 9 to which in comparison units 61, 62 the signal characteristics determined from the transmission signals received from antennas 3 and 5 are compared. The comparison result is provided to a time offset determination unit 7 which, for each of antennas 3, 5, determines the time offset of reception of the respective trans-mission signal with respect to the reception of the transmission signal by antenna 4. From these two time offsets and the known distances between the antennas 3, 4, 5 the speed of the moving entity is determined in unit 8.

Figure 5:
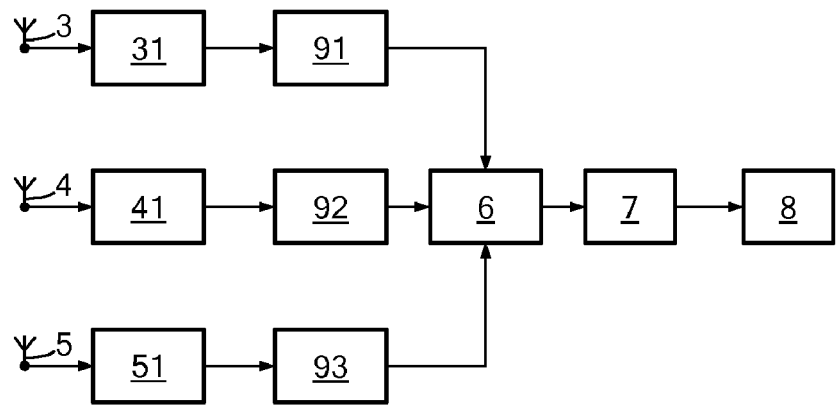
FIG. 5 shows schematic block diagram of a further embodiment of a device according to the present invention using a plurality of antennas.
Figure 6:
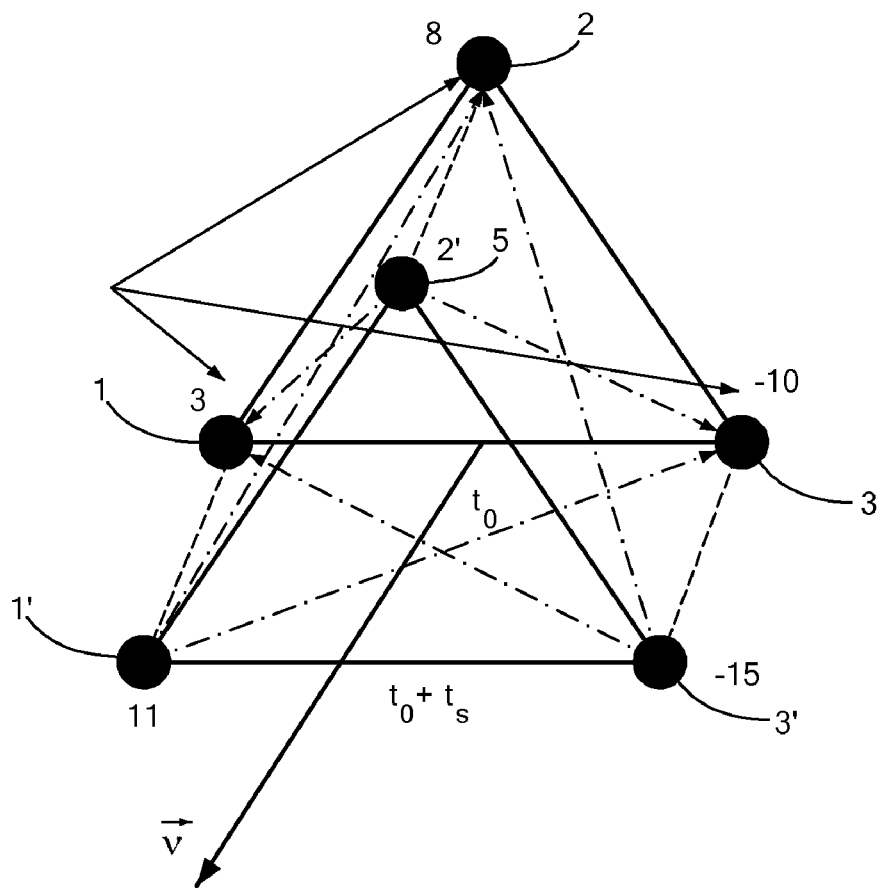
FIG. 6 shows a diagram illustrating the positions of three antennas at different times.

Different methods exist to estimate the speed when using more than two antennas. According to an embodiment as shown in FIG. 5, which is similar to the embodiment shown in FIG. 4 but comprises a storage unit 91, 92, 93 for every antenna 31, 41, 51 and only one comparison unit 6, every antenna captures the signal at the same time and stores it for a time $t_{max}=d_{x,y}/v_{max}$ (e.g. in seconds), where $d_{x,y}$ is the distance between antenna x and antenna y (e.g. in meters), and $v_{max}$ is the maximum possible speed (e.g. in m/s). The time $t_{max}$ is also the processing window. The channel is sampled every $t_s$ seconds which is much shorter than the processing window. Within the processing window the channel and characteristics thereof of each antenna are matched/compared to/with the respective channel characteristics of the other antenna(s). The time (in number of samples from the beginning of the processing window) is captured when an optimum match between the stored signal (taken at time $t_0$) and the currently sampled signal (taken at time $t_0+t_s$) between any two antennas is achieved. This is illustrated in FIG. 6 which schematically shows the positions of the three antennas 1, 2, 3 at time $t_0$ and at time $t_0+t_s$ (indicated by reference signs 1', 2', 3') and where for each antenna at the two shown positions an example for captured antenna specific channel characteristic numbers at the beginning of the processing window is given.

The speed can be estimated as follows: The antennas are assumed to be equidistantly spaced at $d_{x,y}$ (which is however not a stringent requirement). The speed can then be estimated by dividing $d_{x,y}$ by the average of the time differences for optimum match including all possible antenna pairs. Alternatively, instead of taking the average, the time difference which gives the highest level of similarity between any two signals could be used.

In addition to the speed also the direction of movement can be easily determined. Since generally not only the distances between the antennas and the time offsets of reception of the transmission signals are known, but also the relative position of the antennas to each other is known, it is possible by a simple calculation to determine the direction in which a moving entity moves.

The preferred method for estimating the direction of movement is similar to the speed estimation assuming multiple antennas. In this case the method of "highest level of similarity" is used. The actual direction of movement is along the straight line of those antenna pair which in the signal processing as described above resulted in the highest level of similarity. With this method differential heading information can be obtained. If an absolute reference, e.g. the direction of the magnetic north is available, absolute heading information can be obtained.

Figure 7A:
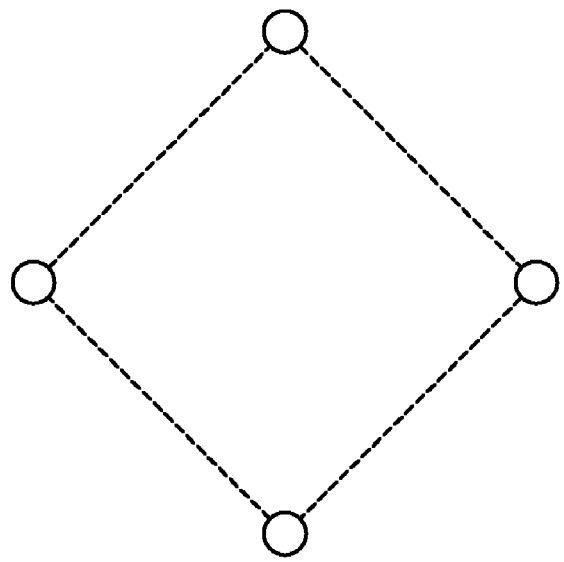
FIG. 7A shows a top view of four antennas located at corners of a square, according to an embodiment of the present invention.
Figure 7B:
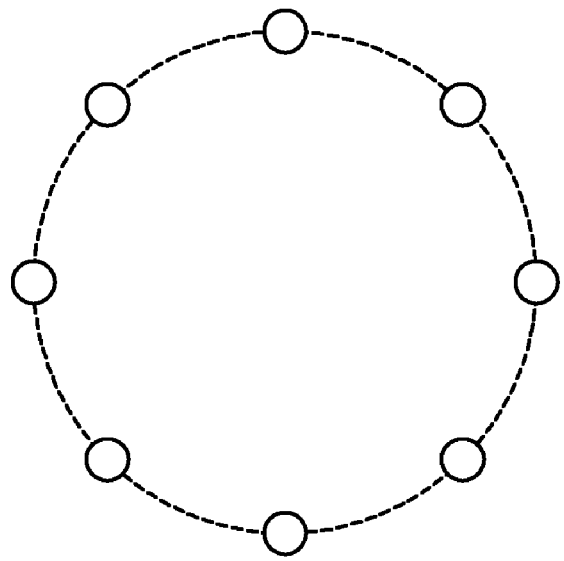
FIG. 7B shows a top view of eight antennas located along a circumference of a circle, according to an embodiment of the present invention.

Although generally the antennas of a plurality of antennas can be freely positioned it is preferred for each of the calculations to be made that the antennas are located at equal distances and in one plane. Top views of different embodiments for pluralities of antennas are shown in FIGS. 7a and 7b according to which in one embodiment (FIG. 7a) four antennas are located at the corners of a square or where according to another embodiment eight antennas are positioned along the circumference of a circle (FIG. 7b). Moreover, the antennas can also be positioned along the surface of a three-dimensional body, such as a sphere or a cube so as to allow speed and movement direction measurements in three dimensions.

In particular in embodiments using only two antennas it is preferred that the antennas are aligned in the direction of movement in order to accurately determine the time offset. When using the invention for a speed determination of a vehicle this is easily possible since there the antennas can be fixed to the vehicle accordingly, since a vehicle, such as a car, has only two major directions of movement.

Figure 8:
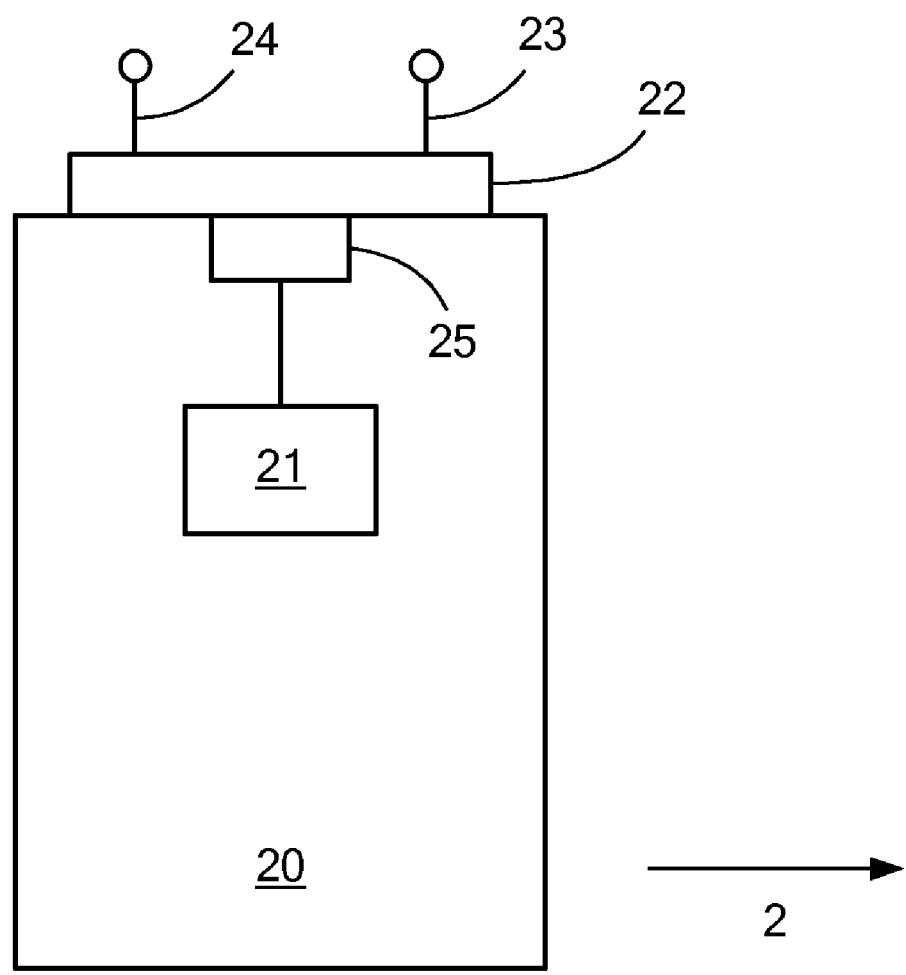
FIG. 8 shows a diagram illustrating a further embodiment for use of the invention, FIG. 9 the time-domain envelope of a typical OFDM symbol.

However, for other applications, for instance when the speed of movement of a mobile unit, such as a PDA, computer, handheld navigation system or mobile phone, shall be determined, all possible directions of movement are available. If the antennas are aligned in the direction of movement thus depends on the way in which the user holds the device. The same holds for other applications, where, for instance, antennas are fixed to a body or piece of clothing or other equipment, where the body can also move laterally. Hence, in a further embodiment of the present invention, such as shown in FIG. 8, a direction measurement unit 21, such as a navigation system or an acceleration sensor, is provided in the moving entity 20, which can be here a mobile telephone. By this unit 21 the current direction of movement of the device 20 can be determined continuously, or at least at desired points in time when a speed measurement shall be made. The antennas 23 and 24 are in this embodiment placed on a movable alignment unit 22 (elements 22 to 24 can also be located inside the device 20), such as a rotatable plate, which can be rotated by a motor 25 under control of the direction measurement unit 21. When the device 20 changes the direction of movement, that change will be recognized by the direction measurement unit 21 which then controls the motor 25 to rotate the alignment plate 22 such that the antennas 23 and 24 are aligned with the changed direction of movement 2 so that the antennas 23 and 24 are positioned as shown in FIG. 8.

In the following a further embodiment of the present invention, in particular using Radio Frequency Signature Matching (RFSM), will be illustrated. Before the details of said embodiment will be explained, some general comments shall be provided as to the principles of Orthogonal Frequency Division Multiplex (OFDM) which can be employed according to the present invention. It shall, however, be noted that any kind of wireless system can be used according to the invention (not necessarily an OFDM system) that is capable of displaying frequency selective fading.

Figure 9:
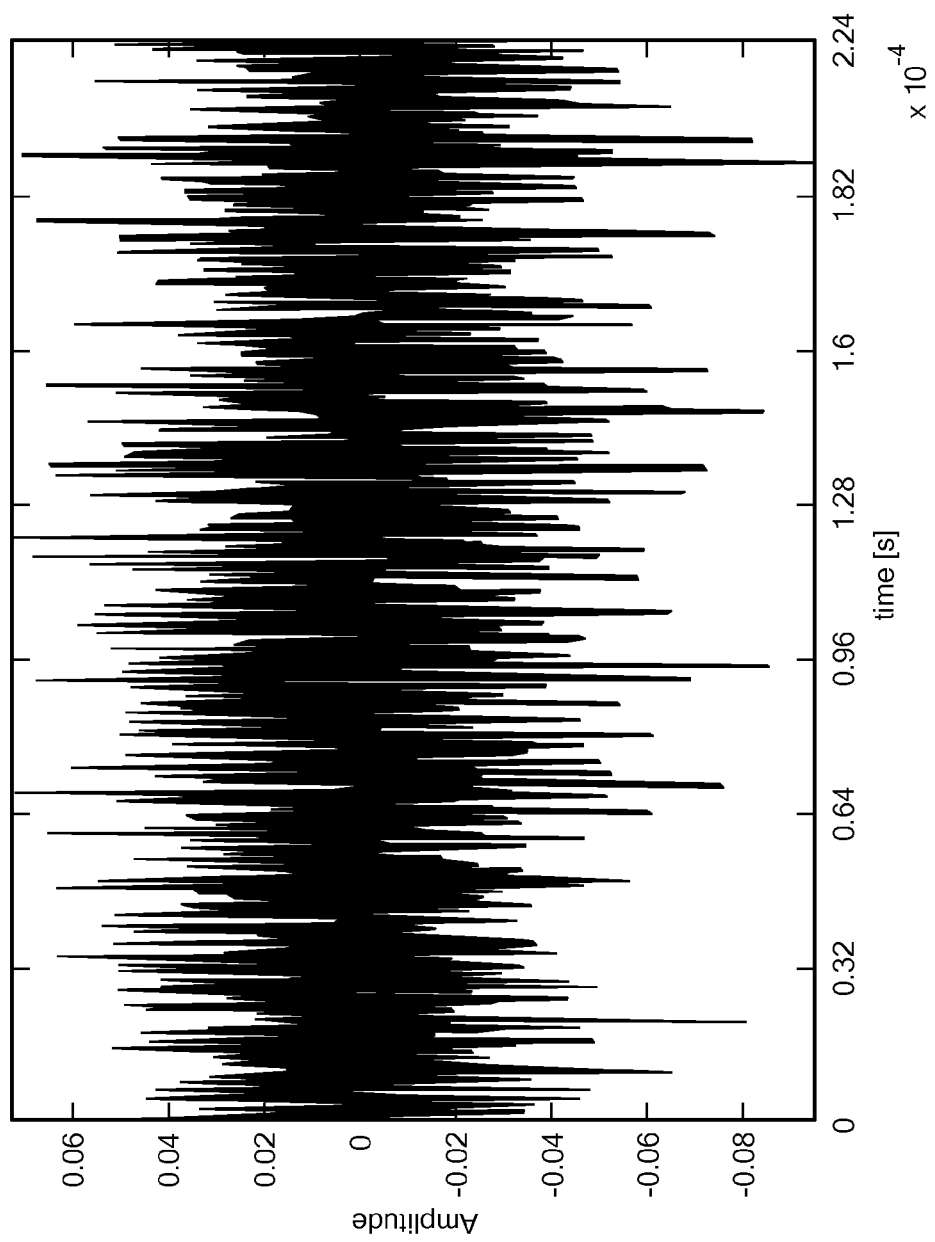
Figure 10:
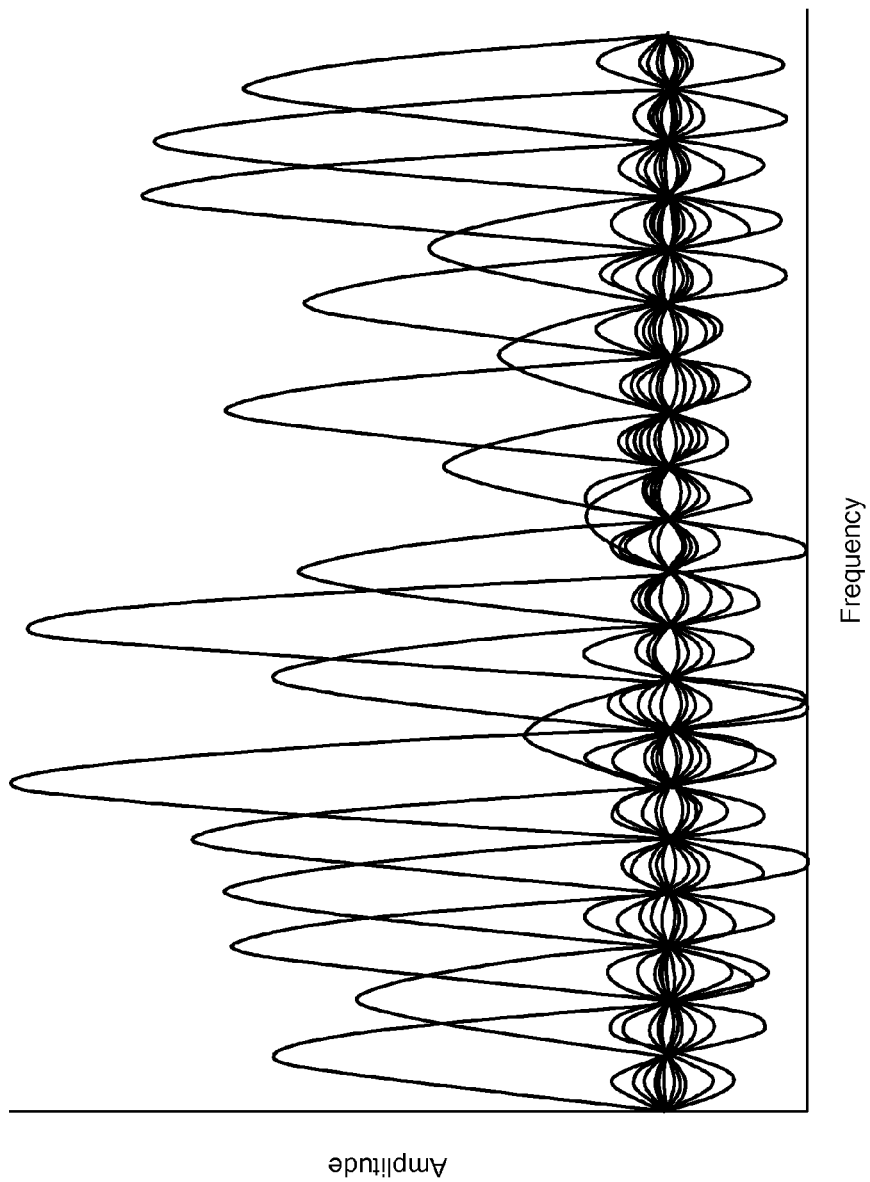
FIG. 10 shows the tones in an OFDM symbol with 19 subcarriers.

DVB-T is a wireless system that utilizes OFDM as the digital modulation scheme. The following figures refer to OFDM in general. FIG. 9 shows the time-domain envelope of a typical OFDM symbol. The symbol duration is depicted as 224 µs—a value common to DVB-T systems operating in the 2K mode. It is clear from the envelope that it must contain a large number of frequency tones. The example is in fact composed of about 1705 "tones" or "subcarriers" (the common nomenclature)—each modulated by the user data. An example is illustrated in FIG. 10.

As is clear from the example, each subcarrier is orthogonal to the others and hence there is no interference as long as the system is perfectly frequency synchronized. In a DVB-T system operating in the 2K mode, there are 1705 subcarriers. 45 of those are used as "pilots". These are known subcarriers that are distributed over the entire frequency band and can be used for channel estimation purposes.

Figure 11:
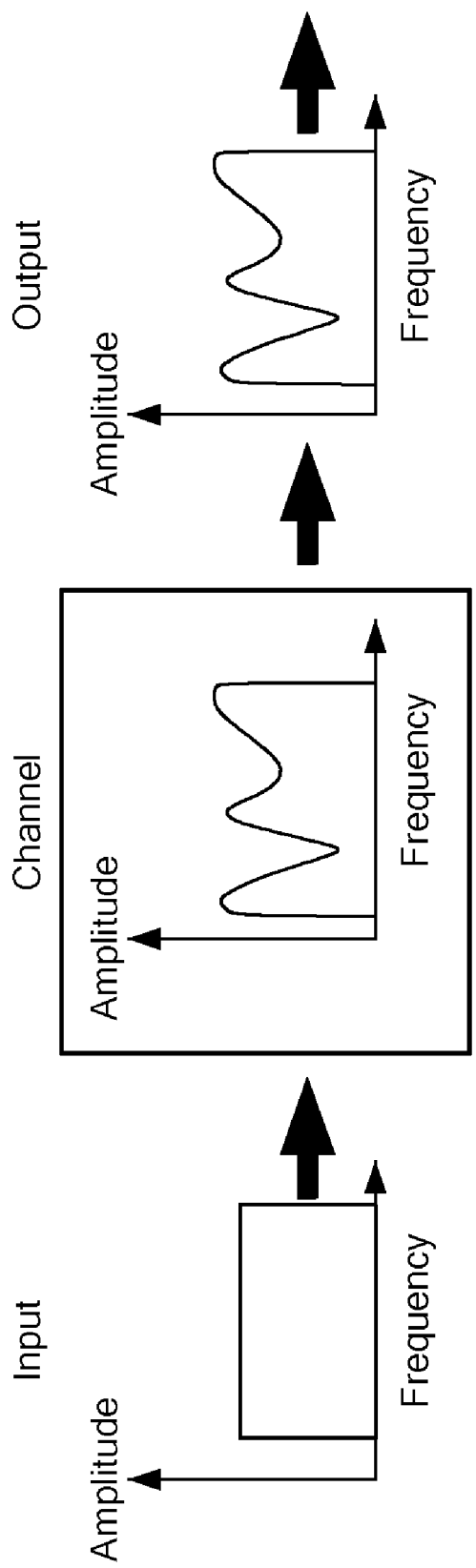
FIG. 11 shows an example of an input/output relationship for a channel.

A channel can be thought of as a filter with a certain frequency response characteristic of the environment. Therefore, as with any filter, the "frequency profile" of the output can be obtained by multiplying the "frequency profile" of the input by the channel frequency response. This is illustrated in FIG. 11. As a direct consequence, if some parts of the input are known (pilots), the channel frequency response can be easily estimated from the received signal. This procedure is commonly known as channel estimation. For the proposed embodiment of the speed estimation algorithm explained in the following, this estimate of the channel frequency response is required. It is not important how this is obtained—there exists multiple methods for reliable channel estimation, which are well known to the skilled person, so that it is assumed that it is a quantity that is readily available.

Channel estimation is a very widely studied and well understood topic. Such channel estimation methods are, for instance, described in detail in "OFDM channel estimation with timing offset for satellite plus terrestrial multipath channels"; Yeon-Su Kang; Do-Seob Ahn; Ho-Jin Lee; Vehicular Technology Conference, 2006. VTC 2006-Spring. IEEE 63rd, Volume 6, 2006 Page(s):2592-2596 and "Efficient Implementation of Robust OFDM Channel Estimation"; Auer, G.; Personal, Indoor and Mobile Radio Communications, 2005; IMRC 2005. IEEE 16th International Symposium on Volume 1, 11-14 Sep. 2005 page(s):629-633. Equalization is a topic that is closely related to channel estimation and is treated in all communications textbooks. One popular example is "Digital Communications"; John G. Proakis; $4^{th}$ Edition; McGRAW-HILL INTERNATIONAL EDITION Electrical Engineering Series.

Now, the proposed embodiment shall be explained in more detail.

Due to its very nature, the Global Positioning System (GPS) does not work well (if at all) indoors or in other heavily shadowed locations. It requires a direct line of sight (LOS) between the user equipment (UE) and the GPS satellites for accurate geolocationing—a requirement that cannot be fulfilled in the aforementioned locations. This limitation has motivated research into indoor locationing methods, one of which is the PDR (Pedestrian Dead Reckoning) approach. The general idea behind PDR is to start at a location with known coordinates and guess the subsequent locationing data from an estimate of the user's speed and heading. Evidently, an accurate estimate of the user speed is vital for PDR based locationing schemes.

A typical approach is via an estimation of the user's step length, as for instance described in Jani Kappi, Jari Syrjarinne, and Jukka Saarinen, MEMS-IMU based-pedestrian navigator for handheld devices, in *ION GPS* 2001, pages 1369-1373, Salt Lake City, Utah, Sep. 11-14 2001 or Helena Leppakoski, Jani Kappi, Jari Syrjarinne, and Jarmo Takala, Error analysis of step length estimation in pedestrian dead reckoning, in *ION GPS* 2002, pages 1136-1142, Portland, Oreg., Sep. 24-27 2002. First, an time-acceleration magnitude signal is obtained from the three orthogonal accelerometers. Steps are then defined by the positive-going zero crossings of the low-pass filtered version of that signal. Next, numerical parameters describing the step model (maximum/minimum acceleration, time between steps) are calculated. These parameters are then used in a feedforward neural network (NN) as input training patterns. The output training patterns are the step lengths estimated from GPS position fixes, interpolated to footfall occurrences. The NN can then be optimized using non-linear optimization techniques such as the scaled conjugate gradient method.

The other academically popular class of estimators are based on the level crossing rate (LCR) approach. The LCR of a random process can yield a lot of useful information about the underlying process. Used in conjunction with the Rayleigh fading envelope seen by mobile terminals (MT), estimates of the maximum Doppler frequency and hence the speed can be obtained. The mobile speed estimation (MSE) technique proposed by Zhao and Mark (Lian Zhao and Jon Mark, Mobile speed estimation based on average fade slope duration, in *IEEE Transactions on Communications*, Vol. 52, No. 12, pages 2066-2069, December 2004) makes use of the zero crossing rate (ZCR) of the slope (first derivative) of the underlying fading process to obtain an estimate of the maximum Doppler frequency. The average number of sampling intervals in a positive-going (or negative-going) slope of the fading envelope defines the average fade slope duration (AFSD) and is directly related to the maximum Doppler frequency. From an estimate of the AFSD, the speed can be calculated in a straight-forward manner. Although the algorithm is quite accurate for high speeds, its accuracy drops at the low speeds associated with pedestrians. Narasimhan and Cox (Ravi Narasimhan and Donald Cox, Speed estimation in wireless systems using wavelets, in *IEEE Transactions on Communications*, Vol. 47, No. 9, pages 1357-1364, September 1999) proposed another MSE algorithm that makes use of the fact that the number of local minima of the fading envelope (in a semilog sense) over a wavelength is directly related to the mobile speed. Therefore, from an estimate of the mean distance between the local minima of the fading envelope, the speed can be calculated. Continuous wavelet transform is used to determine the separation. Although the simulation results shows a good level of accuracy at low speeds, the need for the CWT makes this method computationally complex and expensive.

The solution proposed according to the present embodiment here can be classified as a RFSM based approach. However, unlike traditional RFSM locationing algorithms that must have prior knowledge of the RF signature at known coordinates, the proposed embodiment requires no such a priori information. The proposed method requires a multi-antenna setup and a functional RF source such as a DVB-T transmitter station. For each spatial dimension, at least two antennas are required.

Figure 12:
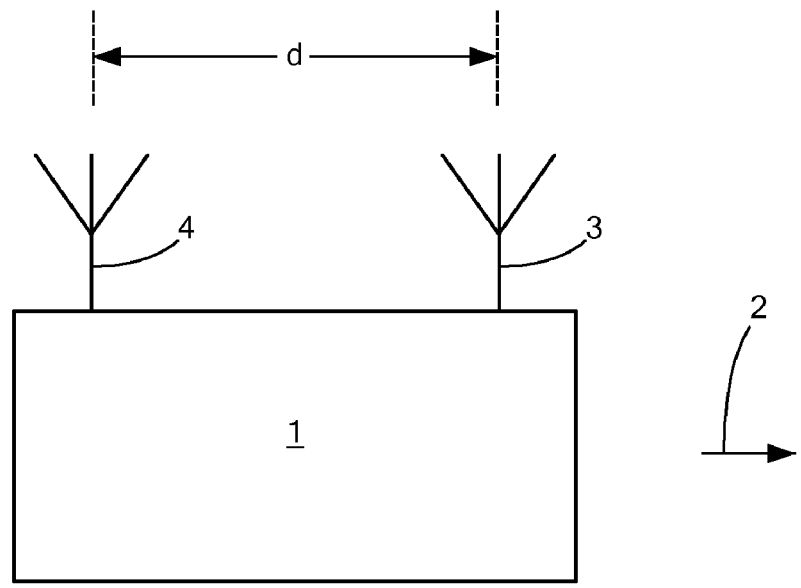
FIG. 12 illustrates one dimensional speed estimation using RF signature matching.

For simplicity, let movement be confined to one dimension only (the idea applies to the general 3-dimensional case in a straight-forward manner). Then, assume that the plane of the antenna array comprising the two antennas 3, 4 is parallel to the direction of motion 2 of the moving entity 1 as shown in FIG. 12. Now, if the array moves forward with a speed v then the channel seen by antenna 3 at time t=0 will also be seen (slightly evolved—depending on speed) by antenna 4 at time t=τ. As the distance d between the antennas is predefined and therefore known, the speed is easily estimated using the formula v=d/τ.

The estimate of the channel frequency response (CFR) may be used as the RF signature metric. By correlating the current CFR estimate from antenna 4 with a number of previous CFR estimates from antenna 3, the time delay can be determined. The number of previous CFR estimates maintained will dictate the accuracy of the estimation algorithm.

As such, the method requires a certain amount of memory to hold the CFR estimate database but is computationally rather cheap. This is in contrast to the wavelet based LCR method that requires CWT at each stage. Although the AFSD method is computationally simple and requires little memory, it is only accurate at high speeds—a scenario that does not quite relate to the problem of pedestrian locationing & navigation. Finally, the neural network used for the step length estimation based method requires extensive prior training and therefore makes the device highly personalized. Also, it cannot cope with sudden changes in walking behaviour. These problems are irrelevant for the proposed method here, as it requires no training and is able to adapt to changes in the user's speed.

Figure 13:
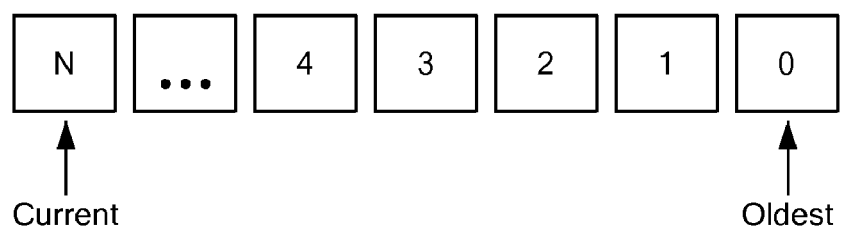
FIG. 13 shows a block diagram of the channel frequency response buffers required for the embodiment illustrated in FIG. 12.
Figure 13:
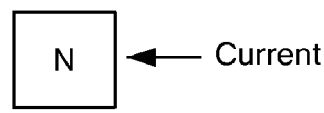

As stated earlier, the proposed method requires a database associated with antenna 3 that is capable of storing the current and N previous CFR estimates. The CFR estimate buffer B associated with antenna 4 only needs to hold the current estimate (FIG. 13).

At every estimation instant, the current CFR estimate at antenna 4 is crosscorrelated against the CFR estimates in database A associated with antenna 3 to determine the lag. The detection process is therefore $$lag = \underset{k}{\operatorname{argmax}}(B * A_k);$$
$$k = 0, \ldots, N.$$

The operator "*" represents the cross-correlation at delay=0. If the lag is detected to be zero, it is simply ignored and the algorithms moves on to the next speed estimation cycle.

As the cross-correlation at delay=0 is nothing more than the dot-product between the two vectors B and $A_k$, the entire procedure simplifies to a series of normalized dot-product calculations followed by a maximum detection. The simplified detection rule is then $$lag = \underset{k}{\operatorname{argmax}}\left(\frac{B \cdot A_k}{\|B\| \cdot \|A_k\|}\right);$$
$$k = 1, \ldots, N.$$

In order to define further system parameters, certain physical constraints must be defined. Assuming that the average walking speed of an adult human is between 1-1.5 m/s, lower and upper speed detection limits of $v_{min}$=0.1 m/s and $v_{max}$=15 m/s respectively are proposed. With an antenna separation distance d, the shortest delay detectable (i.e. a lag of 1) will be d/15. The longest delay that needs to be accommodated is then given by d/0.1. Therefore the minimum required size for the database is $$\left\lfloor \frac{\left(\frac{d}{0.1}\right)}{\left(\frac{d}{15}\right)} \right\rfloor + 1 = 151.$$

i.e. N=150. The one additional slot is needed to store the current CFR estimate.

At this point, the CFR estimation frequency must be defined. Assuming a DVB-T radio source with 8 MHz channels and operating in 2K mode, the duration of one OFDM symbol, $T_S$, is 224 µs. As there are 1705 subcarriers, each CFR estimate consists of 1705 samples. The estimation interval, $\hat{i}$ (in terms of the number of OFDM symbols that must elapse between estimates) is defined as $$\hat{i} = \left\lfloor \frac{d}{v_{max} \times T_s} \right\rfloor \times \frac{1}{\mu}.$$

where µ is an adaptive scaling parameter used to improve the accuracy of the estimates. µ has a range of [1, $\hat{i}$ (µ=1)]. Starting with an initial value of 1, the rough speed estimates are used to find the new value of µ to be used via linear interpolation. To prevent false measurements, the correlation-product with the highest value is compared against a predefined threshold.

Higher speed results in a higher value of µ resulting in an increase in the estimation frequency. Due to the increased frequency, shorter time lapses can be detected and hence higher speeds can be accurately estimated. Please see the following example:

let µ=1, d=0.05 m, $V_{max}$=15 m/s, $T_s$=224 µs. Then:
$\hat{i}$=14→i.e. estimation is done every 14 OFDM symbols==3.136 ms.
So the speeds that can be detected are:

Lag=1: 0.05/(0.003136*1)=15.944 m/s

Lag=2 0.05/(0.003136*2)=7.9719 m/s

Lag=3 0.05/(0.003136*3)=5.3146 m/s

Lag=4 0.05/(0.003136*4)=3.9860 m/s

...

Lag=148 0.05/(0.003136*148)=0.10773 m/s

Lag=149 0.05/(0.003136*149)=0.10701 m/s

Lag=150 0.05/(0.003136*150)=0.10629 m/s

Now let µ=14, d=0.05 m, $V_{max}$=15 m/s, $T_s$=224 µs. Then:
$\hat{i}$=1→i.e. estimation is done every OFDM symbols==224 µs.
So the speeds that can be detected are:

Lag=1: 0.05/(224 µs*1)=223.21 m/s

...

Lag=14 0.05/(224 µs*14)=15.944 m/s

Lag=15 0.05/(224 µs*15)=14.881 m/s

Lag=16 0.05/(224 µs*16)=13.951 m/s

Lag=17 0.05/(224 µs*17)=13.13 m/s

...

Lag=148 0.05/(224 µs*148)=1.5082 m/s

Lag=149 0.05/(224 µs*149)=1.4981 m/s

Lag=150 0.05/(224 µs*150)=1.4881 m/s

As seen from the examples, a high value of mu improves the accuracy at higher speeds while sacrificing the ability to detect lower speeds. A low value of µ allows accurate detection of low speeds at the expense of accuracy at high speeds. This adaptive behaviour is one of the key features of our proposal.

Figure 14:
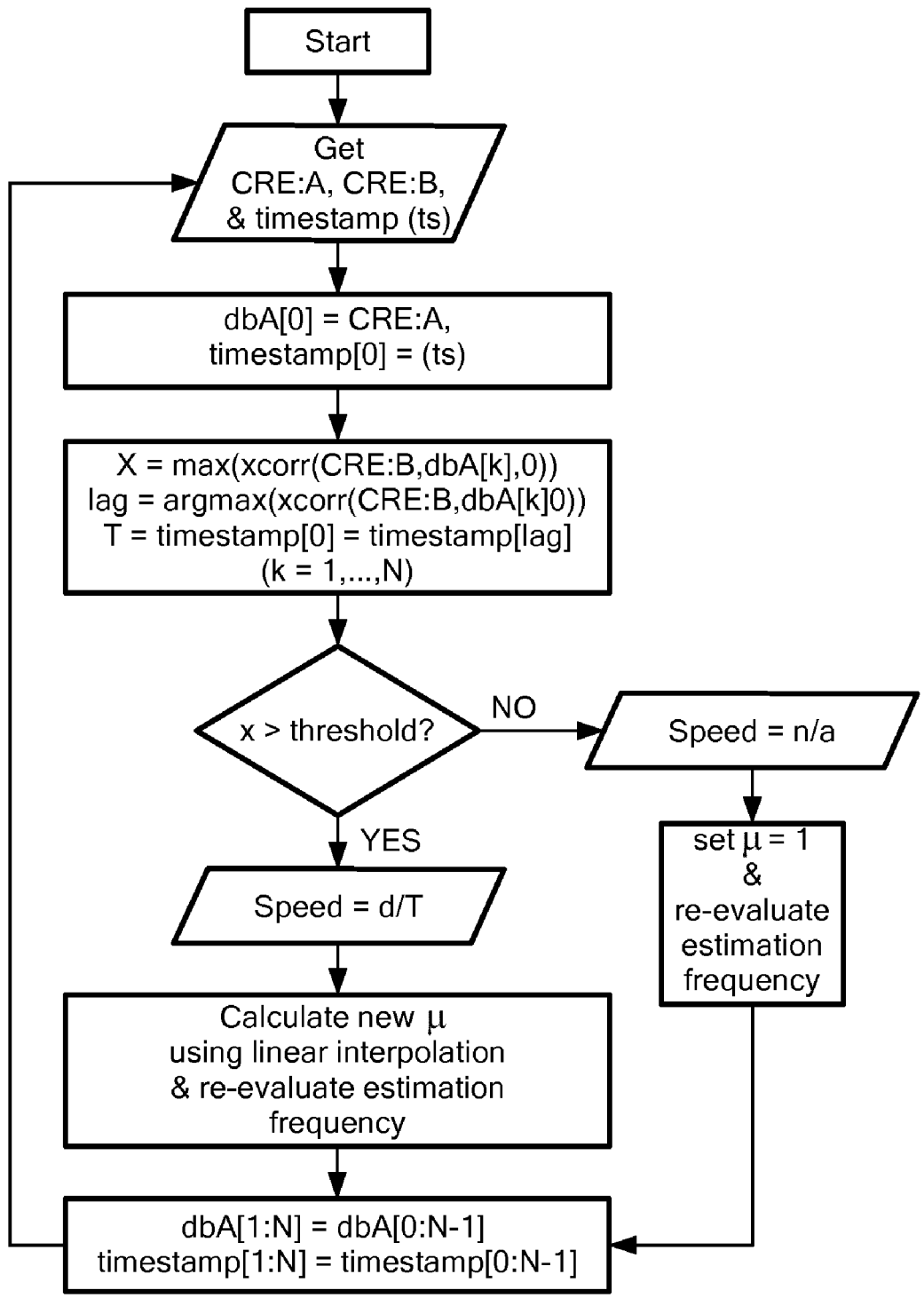
FIG. 14 shows a flow chart of a method according to the embodiment illustrated in FIG. 12.

To prevent false measurements, the correlation-product with the highest value is compared against a predefined threshold. FIG. 14 shows an algorithmic flowchart of the one-dimensional and unidirectional speed estimation algorithm. Therein CRE means channel response estimate, "dbA[ ]" is the CRE buffer A associated with antenna 3. The function xcorr(a, b, L) provides the normalized cross correlation product at lag=L, i.e. it performs the operations necessary to compute the parenthesized expression of the above formula for determining the lag.

Figure 15:
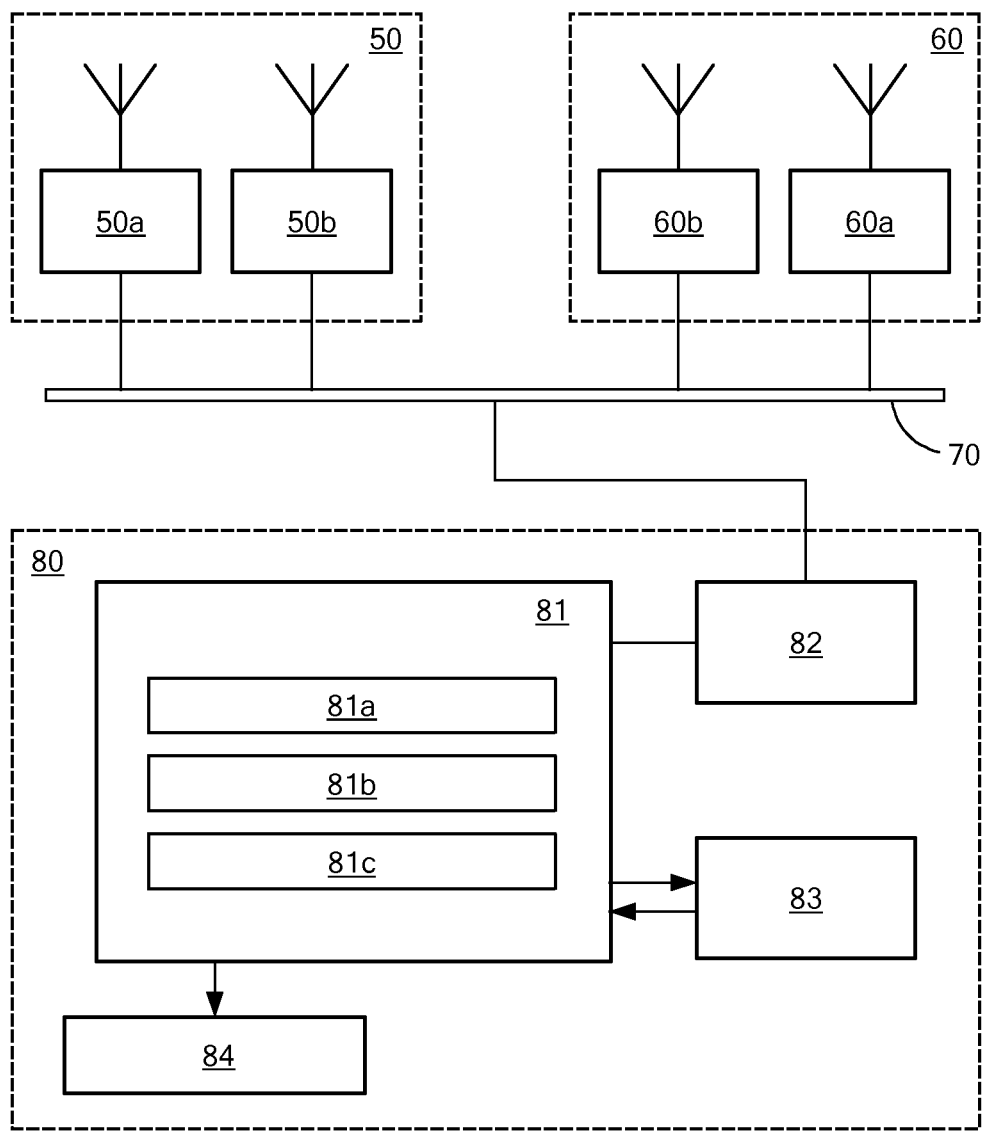
FIG. 15 shows a block diagram of the device according to the embodiment illustrated in FIG. 12.

A block diagram of the device of the last described embodiment is shown in FIG. 15. There is shown a first antenna array 50 provided—in this embodiment—with two antennas arranged along a first direction (here x-direction) and respective tuners 50a, 50b for said antennas. Further, a second antenna array 60 provided—in this embodiment—with two antennas arranged along a second direction (here y-direction)

and respective tuners 60*a*, 60*b* for said antennas is shown. The outputs of the tuners 50*a*, 50*b* and 60*a*, 60*b* are connected to the I$^2$C bus 70 to which also an FPGA platform 80 is connected via an I$^2$C controller 82. Said FPGA platform 80 further comprises an FPGA 81, in which the main steps of the above described embodiment are carried out, including a correlation means 81*a*, an argmax and threshold calculation means 81*b* and a speed calculation means 81*c* for speed calculation and adaptation of the estimation frequency through a change of the parameter μ (determined by linear interpolation from the current speed estimate). Said FPGA is further connected to a storage means 83, e.g. an SDRAM or a flash memory. For displaying the calculated result a speed display 84 may be provided.

According to the described embodiment it is assumed that the antenna array remains fixed to the horizontal plane—i.e. the array is not free to rotate in the vertical plane. The purpose of the device is to provide a speed estimation—pedestrian speed estimation is simply an example of possible applications.

An analysis of the algorithm's complexity reveals that any recent high-density FPGA based platform is therefore suitable for this purpose. To store the required data, about 2 Megabytes of SDRAM (fast-memory) is sufficient. 4 DVB-T tuner boards f can be used to obtain the required channel frequency response over the I$^2$C bus—implying that a I$^2$C controller is required on the hardware platform.

If the above described embodiment is to be extended to the three-dimensional and bidirectional case, an array with antenna pairs in each of the three dimensions will be required. For bidirectional support, databases for the channel response estimates are maintained for each antenna in a pair. Then, six independent estimation processes (two for each antenna pair) are run in parallel. The non-zero speed estimates from each pair can then be added as a vector sum to yield the velocity of the device in three-dimensions.

The described embodiment can be easily implemented in relatively inexpensive hardware. It can provide reliable estimates at low velocities—a feature that is uncommon for most existing methods.

The proposed embodiment finds direct application in the field of indoor mobile positioning using Pedestrian Dead Reckoning (PDR). However, it can also be readily utilized to solve any problem that requires speed estimation without the use of conventional equipment. Applications of this embodiment may particularly include the integration in hand-held devices such as PDAs/cellphones for pedestrian speed estimation and stand-alone devices for measuring human running/walking speed and the speed of transports such as bicycles, kick scooters, skateboards, rollerblades, etc.

It should be mentioned that multiple antennas can also be used to solve the problem of movement in any direction.

The present invention can be used in many different applications. One application is to accurately and continuously measure the speed of a vehicle, such as a car. In particular under conditions, such as snow or heavy rain, where the wheels might get locked due to heavy breaking so that the speed can not be determined via the wheels, the invention can be used.

Further applications are relative positioning of pedestrians (dead reckoning), locating children, animals and goods/containers, tracking of cars and other objects, aiding tools for handicapped/blind people.

Multiple antenna receivers are becoming more prevalent so there could be very little extra cost to the available system. If MIMO systems become more prevalent in the automotive sector (for example for mobile DVB-T or WiMax reception), then the speed estimate could be made available to the vehicle (CAN) bus which would then an interesting addition to the ABS sensor based speed estimates.

It follows a further description of the invention:

1 INTRODUCTION

Pedestrian dead reckoning (PDR) is a popular choice for positioning and navigation in areas (e.g. indoors) where GPS based solutions cannot be used. Two pieces of information are essential before a valid location estimation can be made: a reference point with known coordinates and the velocity (speed and heading) at sufficiently close and successive intervals. Given the needed information, displacement of the user from the reference location can be approximated and hence an estimate of the new location coordinates can be obtained.

Accurate heading information is readily available from sensors such as a ring laser gyro [1]; it is the speed estimate that has been difficult to obtain with a sufficient degree of accuracy. Common approaches seen in literature include the use of step length estimates [2, 3] and the use of various algorithms that aim at extracting speed information from the Rayleigh fading envelope seen at a radio receiver terminal attached to the user [4, 5, 6]. However, each method suffers from certain drawbacks.

Step length estimates can be obtained from neural networks trained with the user's walking pattern. The first step is to start with a time-acceleration magnitude signal obtained from three orthogonal accelerometers. Steps are then defined by the positive-going zero crossings of the low-pass filtered version of that signal. Next, numerical parameters describing the step model (maximum/minimum acceleration, time between steps) are calculated. These parameters are then used in a feed-forward neural network (NN) [7] as input training patterns. The output training patterns are the step lengths estimated from GPS position fixes, interpolated to footfall occurrences. The NN can then be optimized using non-linear optimization techniques. As the method requires clear detection of the user's footfalls, any physical device can only be used by pedestrians and must be mounted on the person. The other problem is that errors tend to accumulate with every step—at the absence of frequent absolute coordinate updates from an external source, the error quickly becomes unacceptable. It is also unable to cope with sudden changes in the user's walking pattern.

The level crossing rate (LCR) of a random process can yield a lot of useful information about the underlying process. Used in conjunction with the Rayleigh fading envelope seen by mobile terminals (MT), estimates of the maximum Doppler frequency and hence the speed can be obtained (3). The mobile speed estimation (MSE) technique proposed by Zhao and Mark [5] makes use of the zero crossing rate (ZCR) of the slope (first derivative) of the underlying fading process to obtain an estimate of the maximum Doppler frequency. The average number of sampling intervals in a positive-going (or negative-going) slope of the fading envelope defines the average fade slope duration (AFSD) and is directly related to the maximum Doppler frequency. From an estimate of the AFSD, the speed can be calculated in a straight-forward manner. Although the algorithm is quite accurate for high speeds, its accuracy drops at the low speeds associated with pedestrians. Narasimhan and Cox [6] proposed another MSE algorithm that makes use of the fact that the number of local minima of the fading envelope (in a semilog sense) over a wavelength is directly related to the mobile speed. Therefore, from an estimate of the mean distance between the local minima of the fading envelope, the speed can be calculated. Continuous wavelet transform (CWT) is used to determine the separation. Although the simulation results shows a good level of accuracy at low speeds, the need for the CWT makes this method computationally complex and expensive.

In this paper, a novel method of speed estimation using relative radio frequency (RF) signature matching is described. The proposed method correlates the RF signatures at two antennae separated by a known distance to determine the time it takes for the trailing antenna to "see" the same channel conditions as that seen by the leading antenna. As the antenna separation is predefined and known (e.g. in a MIMO device), the speed is easily calculated from an estimate of the time delay. As will be shown later, it also employs an adaptive algorithm that allows accurate estimates at both high and low velocities. Furthermore, it is computationally extremely simple as the main operation only involves the calculation of correlation values between two channel estimates.

The rest of this paper is organized as follows. In Section 2 the wireless channel model considered is presented and in Section 3 the speed estimation algorithm is described. Section 4 provides details of a MATLAB realization and the simulation results. Section 5 concludes the paper.

2 WIRELESS CHANNEL MODEL

In a typical urban environment (specially indoors), there is hardly a single dominant line of sight (LOS) path between a radio transmitter and receiver. Signals can experience multiple reflections, refraction, diffraction, and scattering before reaching the receiver. As a result, the received signal consists of multiple delayed versions of the original signal that arrive with random delays, phase-shifts, and angle of arrival (AoA). This is known as multipath effect. In addition to the above, the signal can also experience Doppler shifts caused by movements of the transmitter, receiver, and/or any objects affecting the channel. The signal received from a multipath channel by an antenna array can be represented by $$\vec{h}(t, \tau) = \sum_{l=0}^{L(t)-1} A_l(t) \exp^{j\phi_l(t)} \vec{a}(\theta_l(t)) \delta(t - \tau_l(t)) \quad (1)$$

where L (t) is the number of multipath components, $A_l$ is the amplitude, $\phi_l$ is the carrier phase shift, $\tau_l$ is the time delay, and $\theta_l$ is the AoA of component l. The amplitude is modeled as a Rayleigh distributed random variable and the AoA and phase shift are uniformly distributed [8]. Furthermore, the delay is exponentially distributed [9]. $\vec{a}(\theta_l(t))$ is known as the array response vector. When the signal and antenna array (containing m antennae) are restricted to a two-dimensional space, the array response vector is given by $$\vec{a}(\theta_l(t)) = \begin{bmatrix} \exp(-j\Psi_{l,1}) \\ \exp(-j\Psi_{l,2}) \\ \exp(-j\Psi_{l,3}) \\ \vdots \\ \exp(-j\Psi_{l,m}) \end{bmatrix} \quad (2)$$

where $\Psi_{l,i}(t) = [x_i \cos(\theta_l(t)) + y_i \sin(\theta_l(t))] \cdot \beta$ and $$\beta = \frac{2\pi}{\lambda}$$

is the wave-number [8].

Figure 16:
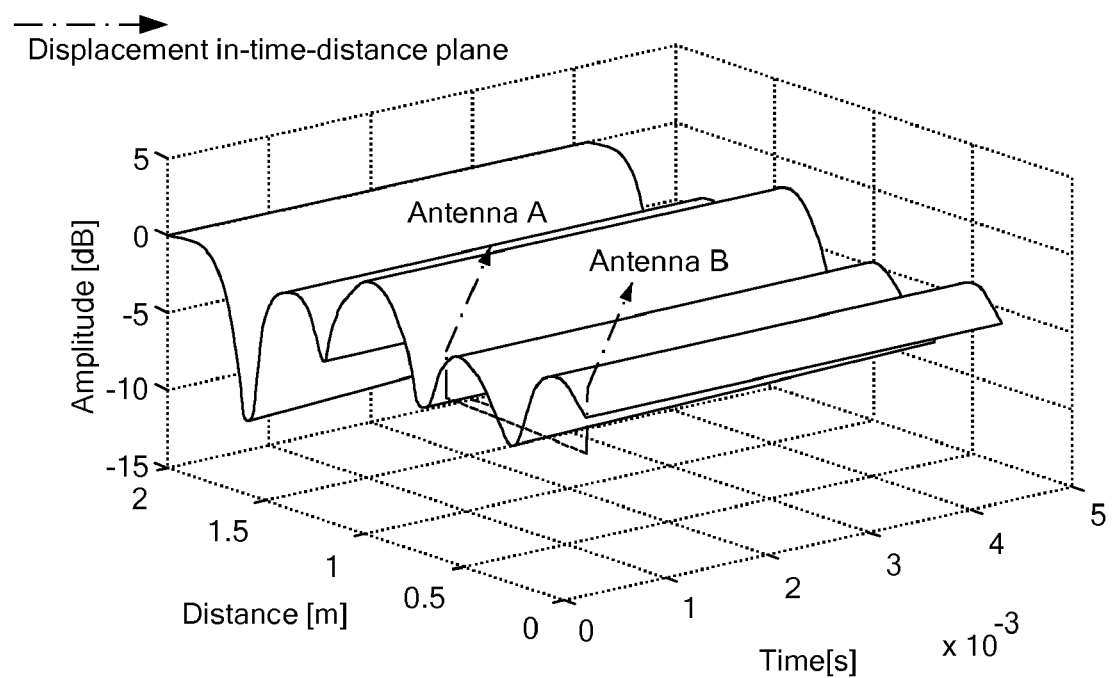
FIG. 16 is a graph illustrating amplitude versus time and distance in a multipath channel.

The maximum Doppler shift, $f_{d(max)}$, experienced by a receiver is dependent on the speed and is given by $$f_{d(max)} = \frac{v}{\lambda} \quad (3)$$

where v is the speed and $\lambda$ is the carrier wavelength [10]. The presence of Doppler spread in a multipath channel causes it to display variations in time (small scale fading): the higher the Doppler frequency, the shorter is the coherence time [10]

$$T_c = \frac{0.423}{f_{d(max)}} \quad (4)$$

of the channel. Fortunately, at velocities typical of pedestrians (approx. 1.5 ms$^{-1}$), the resultant Doppler frequency is small (1.6 Hz for a carrier frequency of 474 MHz) and hence the coherence time of the channel is quite large (approximately 0.26 s). FIG. 16 shows the space-time characteristics of a multipath Rayleigh fading channel with a low Doppler spread.

It is clear from the plot that although the channel stays nearly constant over time, it shows rapid variations in space—the "coherence distance" is on the order of some tens of centimeters. The behavior displayed by the channel, in terms of coherence time & space, is exactly as needed for the proposed speed estimation technique.

3 RF SIGNATURE MATCHING ALGORITHM

Figure 17:
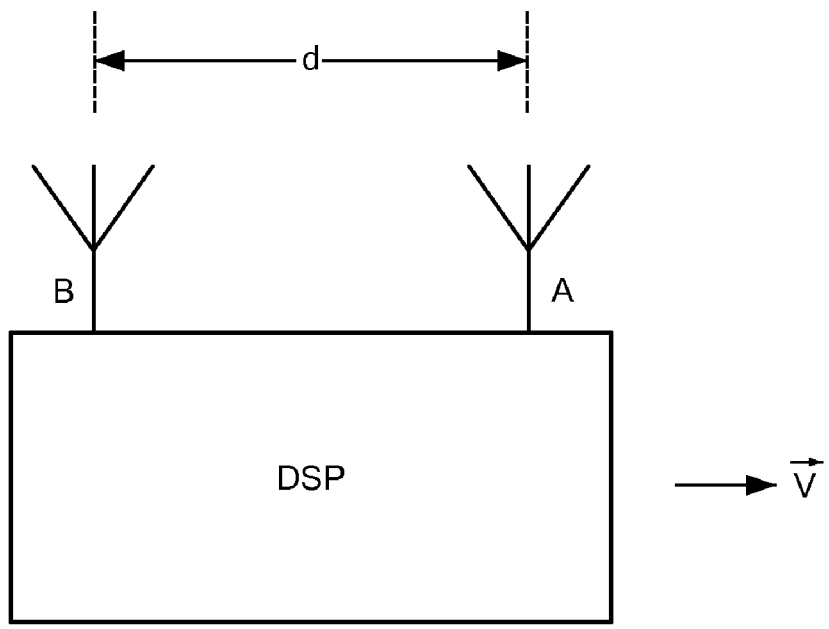
FIG. 17 is a schematic block diagram of a two-antenna speed estimator setup.

As stated in the previous section, a channel response that shows rapid variations in space but remains relatively unchanged in time is essential to the success of the speed estimation algorithm. It requires a multi-antenna setup and an accessible RF source such as a local digital television transmitter. For each spatial dimension, at least two antennae are required. For simplicity, let movement be confined to a single spatial dimension only (the idea applies to the general three dimensional case in a straightforward manner) and let the antenna array be aligned parallel to the direction of motion as shown in FIG. 17.

At time t=0 s, the antennae are as shown by the markers in FIG. 16. As the array moves forward, it traces a diagonal line in the space-time plane and after some t seconds, the trailing antenna (Antenna B) will be at the very same point in space that the leading antenna (Antenna A) occupied t seconds ago. As the coherence time of the channel is quite large, Antenna B should see a channel response that is very similar to that seen by Antenna A t seconds ago—i.e. the two responses would be highly correlated. Therefore, the time delay can be estimated by correlating the channel responses seen by Antenna B with a number of previous channel responses seen by Antenna A. As the antenna separation is predefined and known, the speed is easily calculated using $$v = \frac{d}{t} \quad (5)$$

once the time delay has been determined. At this point it should be clear that a knowledge of the fading process or even an accurate estimate of the channel is not necessary for this technique. As the algorithm compares the relative match between two channel estimates, any error or uncertainty in the estimates can be ignored as long as both estimates are affected similarly by the error.

Figure 18:
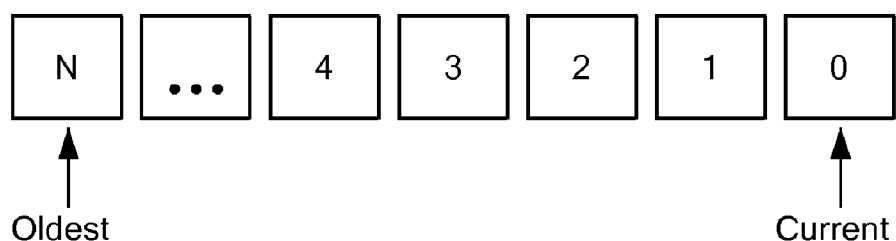
FIG. 18 is a schematic block diagram of buffers to hold channel response estimates for the two antennas of FIG. 17.
Figure 18:
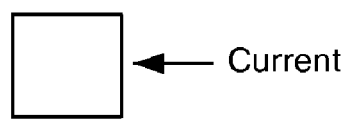

Obviously, a database of channel responses for Antenna A must be maintained. The size of the database will dictate the accuracy of the estimation algorithm. For the simple case where the movement is confined to a single spatial dimension and in the forward direction only, a database capable of holding N previous and the current channel response estimate (CRE) from Antenna A will be required. The buffer associated with Antenna B only needs to hold the instantaneous CRE as depicted in FIG. 18. In addition to the CRE database, a database of associated timestamps will also have to be kept.

At every instant of the speed estimation process, the current CRE at Antenna B is cross-correlated against the CREs at Antenna A to determine lag. Therefore, the detection process is:

$$lag = \underset{k}{\operatorname{argmax}}(B * A_k); k = 1, \ldots, N. \quad (6)$$

The operator "★" represents the cross-correlation at delay=0. The cross-correlation product B★$A_0$ is not considered since it might result in the lag being detected as zero—implying infinite speed.

As the cross-correlation at delay=0 is nothing more than the dot-product between the two vectors B and $A_k$, the entire procedure simplifies to a series of normalized dot-product calculations followed by a maximum detection. The simplified detection rule is then $$lag = \underset{k}{\operatorname{argmax}}\left(\frac{B \cdot A_k}{\|B\| \cdot \|A\|}\right); k = 1, \ldots, N. \quad (7)$$

Once the lag has been determined, it can be used to look up the associated timestamp—allowing for the actual time lapse to be calculated.

In order to obtain further system parameters, certain physical constraints must be defined. Assuming that the average walking speed of an adult human is between 1-1.5 ms$^{-1}$, lower and upper speed detection limits of $v_{min}$=0.1 ms$^{-1}$ and $v_{max}$=15 ms$^{-1}$, respectively, are proposed. A speed of zero can be deduced from a lack of correlation in the CREs at Antenna A and Antenna B. With an antenna separation distance "d", the shortest delay detectable (i.e. a lag of 1) is $$\left(\frac{d}{15}\right).$$

The longest delay that needs to be accommodated is then given by $$\left(\frac{d}{0.1}\right).$$

Therefore, the minimum required size for the database is $$\left\lceil \frac{\left(\frac{d}{0.1}\right)}{\left(\frac{d}{15}\right)} \right\rceil + 1 = 151. \quad (8)$$

I.e. N=150. The one additional slot is needed to store the current CRE. At this point, the needed estimation frequency can be defined. Assume a DVB-T transmitter operating in the 2K mode with 8 MHz channels is available as the RF source. The duration of each OFDM symbol, $T_s$, is then 224 μs [11].

The estimation frequency, î (number of OFDM symbols that elapse between estimates) is defined as $$\hat{i} = \left\lfloor \left\lfloor \frac{d}{v_{max}} \times \frac{1}{T_s} \right\rfloor \times \frac{1}{\mu} \right\rfloor \quad (9)$$

where μ is an adaptive scaling parameter that has been introduced to improve the accuracy of the estimates $$\frac{d}{v_{max}}$$

provides the maximum time that can elapse between two estimates it the upper speed limit of $v_{max}$ is to be detected; therefore, dividing that quantity by $T_s$ and rounding it off to the lower integer yields the maximum number of complete OFDM symbols that can be allowed to pass between the two estimation instants.

μ is an integer that is upper bounded by $$\left\lfloor \frac{d}{v_{max}} \times \frac{1}{T_s} \right\rfloor;$$

this is because estimates cannot be obtained at a rate faster than for every OFDM symbol (î=1). It is lower bounded by 1 since we are not interested in detecting speeds that are below $v_{min}$. Starting with an initial value of 1, the rough speed estimates, $v_{est}$, are used to find the new value of μ to be used. Linear interpolation is used for this purpose:

$$\mu = \begin{cases} \lfloor m \cdot v_{est} + (1 - m \cdot v_{min}) \rfloor, & v_{est} \leq (v_{max} + \epsilon) \\ 1, & \text{otherwise} \end{cases} \quad (10)$$

where $$m = \frac{\left(\left\lfloor \frac{d}{v_{max}} \times \frac{1}{T_s} \right\rfloor - 1\right)}{(v_{max} - v_{min})} \quad (11)$$

TABLE 1

The effect of μ on speeds detectable.

| | ‾ = 1 | | ‾ = 14 | |
|---|---|---|---|---|
| Lag | Speed (m/s) | Lag | Speed (m/s) |
| 1 | 15.944 | 1 | 223.21 |
| 2 | 7.9719 | ... | ... |
| 3 | 5.3146 | 14 | 15.944 |
| 4 | 3.9860 | 15 | 14.881 |
| ... | ... | 16 | 13.951 |
| 148 | 0.10773 | ... | ... |
| 149 | 0.10701 | 149 | 1.4981 |
| 150 | 0.10629 | 150 | 1.4881 | and ε is a small number that is needed to allow the adaptive procedure to converge at the upper end of speed detection range. Its is governed by the absolute difference between $v_{max}$ and the highest speed detectable when µ=1:

$$\epsilon = \left| v_{max} - \left( \frac{d}{T_s \times \left\lfloor \frac{d}{v_{max}} \times \frac{1}{T_s} \right\rfloor} \right) \right|. \quad (12)$$

It should be clear from (10) that a high speed estimate results in a higher value of µ which then causes the estimation frequency (9) to increase—allowing a finer granularity in the time offset estimates. As a result of the finer granularity, the resolution at high speeds is increased*. A lower speed results in a drop in the value of y and causes the estimation frequency to decrease—allowing the accurate detection of lower speeds. Table 1 shows the effect of µ on the speeds that can be detected for d=0.05 m. $v_{max}$, $v_{min}$, and $T_s$ are as described earlier. The speed is calculated from the lag, k, using $$v_{est} = \frac{d}{k \times T_s \times \hat{i}}. \quad (13)$$

*At a distance d=0.05 m, a "granularity" of 0.001 s would only allow the detection of 10 ms$^{-1}$ and 8.33 ms$^{-1}$ corresponding to t=0.005 s and t=0.006 s respectively. However, with a finer granularity of 0.0005 s, a speed of 9.09 ms$^{-1}$ can also be detected (corresponding to t=0.0055 s)—i.e. the resolution is improved.

Table 1 clearly shows that with µ=1, estimation is possible over the entire range—although the resolution at the high end is very poor. With µ=14, the resolution of the estimates at the high end is improved considerably at the expense of a reduced range—speeds lower than 1.48 ms$^{-1}$ can no longer be detected.

It can also be seen that with µ=1 (the starting condition), a true speed of 15 ms$^{-1}$ is most likely to be estimated as 15.944 ms$^{-1}$. At the absence of the parameter $\epsilon$, µ will always remain at that initial value (since the condition $v_{est} \leq (v_{max}+\epsilon)$ in (10) would not be satisfied) and hence the speed will continue to be estimated as 15.944 ms$^{-1}$. With $\epsilon$=1, however, that condition will be satisfied and µ will be increased accordingly—increasing the estimation frequency and yielding an estimate that is more precise than the last.

Table 1 also shows that the speed estimates available over the entire detection range is not continuous. This is due to the fact that the time offset estimates are always multiples of $T_s$ and hence are themselves not continuous.

Figure 19:
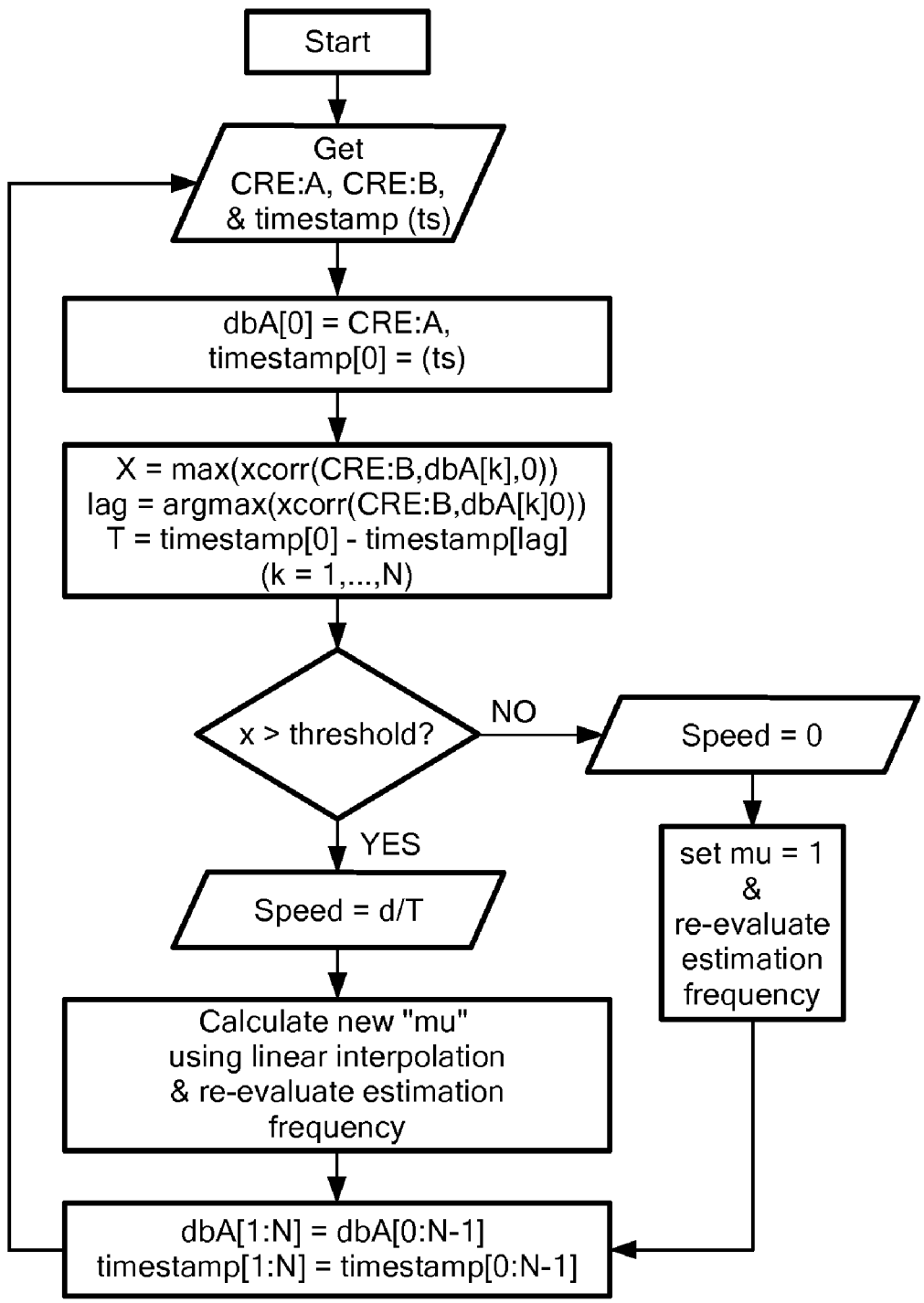
FIG. 19 is a flowchart of an algorithm for estimating speed.

To prevent false measurements, the correlation-product with the highest value is compared against a predefined threshold (a suitable value can be determined empirically). FIG. 19 shows an algorithmic flowchart of the one-dimensional & unidirectional speed estimation algorithm.

If the algorithm is to be extended to the three-dimensional & bidirectional case, an array with antenna pairs in each of the three dimensions will be required. For bidirectional support, CRE databases will have to maintained for each antenna in a pair. Then, six independent estimation processes (two for each antenna pair) will have to be run in parallel. The non-zero speed estimates from each pair can then be added as a vector sum to yield the velocity of the device in three-dimensions.

4 MATLAB IMPLEMENTATION & RESULTS

The following simplifying assumptions are made to ease the simulator implementation:

The carrier phase offsets ($\phi_l$), AoAs ($\theta_l$), and time delays ($\tau_l$) are random but time-invariant.

The channel response estimate is exact and error free.

Displacement is in one dimension only; therefore, $\Psi_{l,i}(t)$ can be simplified to $$\Psi_{l,i}(t)=[x_i \cos(\theta_l(t))] \cdot \beta \quad (14)$$

The multipath channel is modeled by ten independent time-varying Rayleigh fading processes (implemented using MATLAB rayleighchan channel objects) and has a maximum delay spread of 5 µs. The AoA and carrier phase offsets are modeled as random variables uniformly distributed in [0, 2π]. The carrier frequency used is 474 MHz and each OFDM symbol consists of 1705 subcarriers (DVB-T in 2K mode [11]).

The simulator developed allows the following parameters to be set:

Actual user speed in ms$^{-1}$,
The correlation threshold, and
The antenna separation in m.

Figure 20:
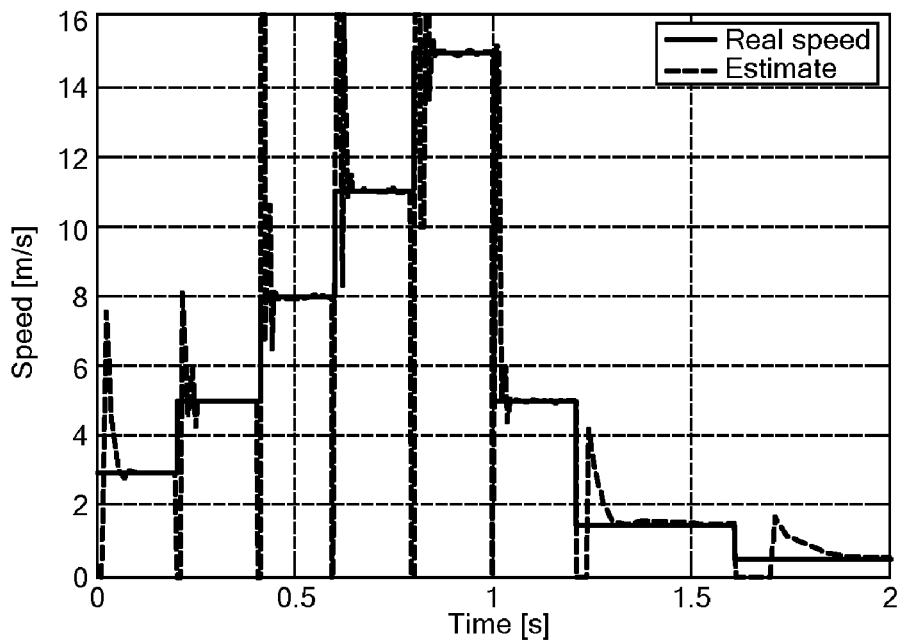
FIG. 20 is a graphical representation generated by a computer simulation of a one-dimensional, unidirectional speed estimation algorithm, in which a threshold and an antenna separation are set to 0.8 and 15 cm, respectively.

The real speed and the estimated speed are plotted together in realtime for comparison. FIG. 20 shows a typical simulation run for an antenna separation of 15 cm. It can be seen that the proposed scheme is capable of accurately estimating the speed once the adaptive part of the algorithm converges. The adaptive procedure is responsible for the initial fluctuations at the speed change boundaries. From the plot it can also be seen that the convergence time for higher speeds is lower than that for the lower speeds; however, it is never more than approximately 0.3 s and hence can be considered as imperceptible. At the average pedestrian speed of 1.5 ms$^{-1}$, the error in the estimate is only 0.7%. With an antenna separation of only 15 cm, the channel responses seen by the antennae at any given time are very similar (see FIG. 16) and hence the correlation threshold needs to be set to a high value to prevent errors during the adaptive phase.

Figure 21:
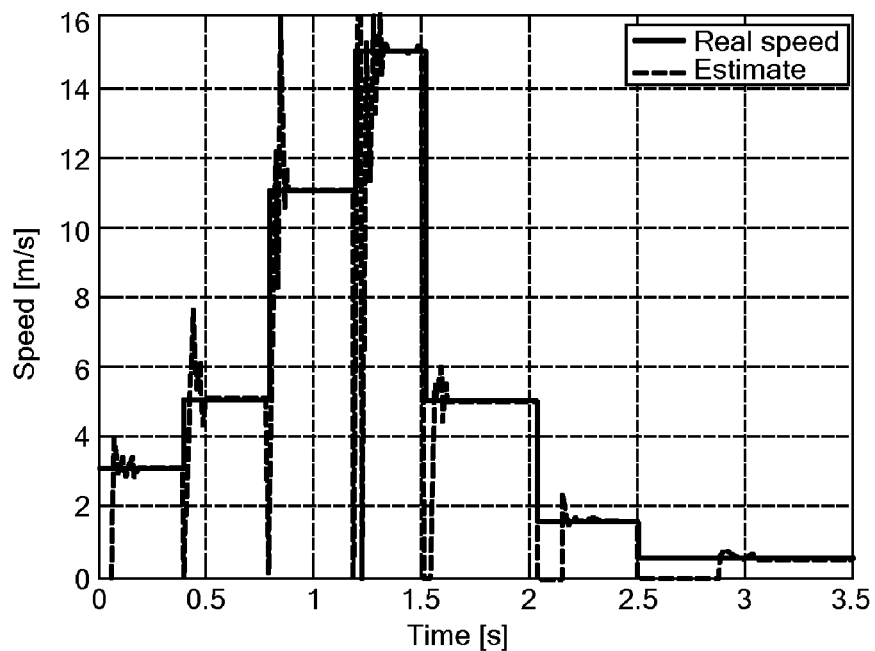
FIG. 21 is a graphical representation generated by a computer simulation of a one-dimensional, unidirectional speed estimation algorithm, in which a threshold and an antenna separation are set to 0.7 and 30 cm, respectively.

Simulation results for an antenna separation of 30 cm and a lower threshold of 0.7 is shown in FIG. 21. Comparing with FIG. 20, it can be seen that the "spikes" at the speed change boundaries are much smaller. From this observation, it can be concluded that the overshoots in FIG. 20 are infact due to the high level of spatial correlation between the antennae. Once again, convergence time for higher speeds is lower than those for lower speed and does not exceed 0.5 s. The estimation error at 1.5 ms$^{-1}$ is almost negligible at 0.23%.

Figure 22:
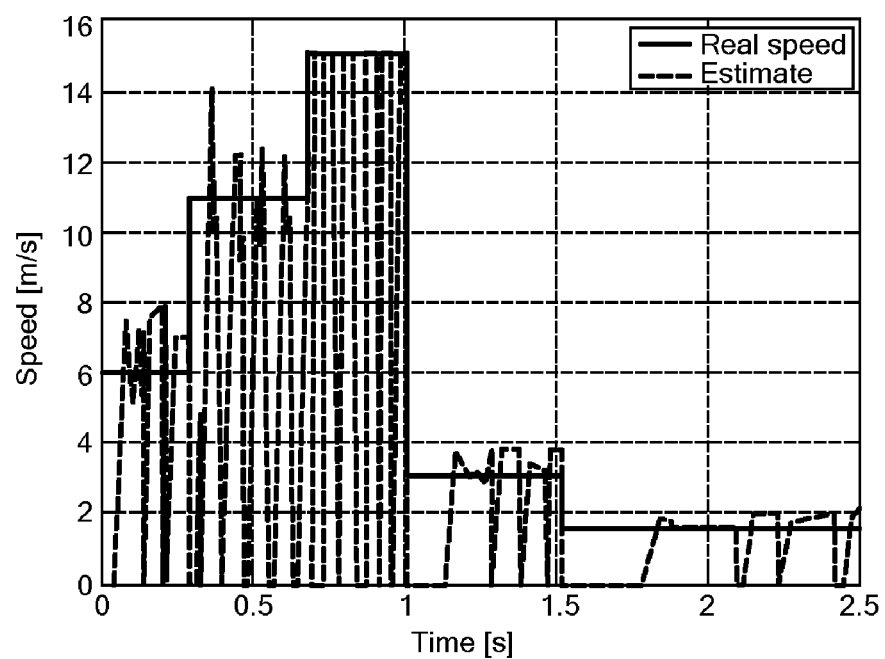
FIG. 22 is a graphical representation generated by a computer simulation of a one-dimensional, unidirectional speed estimation algorithm, in which a threshold and an antenna separation are set to 0.6 and 60 cm, respectively.

The final set of simulation results are for an antenna separation distance of 60 cm and a threshold of 0.5 as shown in FIG. 22. It is clear that the algorithm no longer works at this point. The reason is revealed as soon as the channel coherence time and the required time delay between the antennae are calculated for a speed of 10 ms$^{-1}$. The coherence time is $$T_c = \frac{0.423}{f_{d(max)}} \quad (15)$$

$$= 0.423 \times \frac{\lambda}{v}$$

$$= 0.423 \times \frac{\frac{3 \times 10^8}{474 \times 10^6}}{10} = 0.027s$$

while the time it takes for Antenna B to reach Antenna A is 0.6/10=0.06 s. As this time is much longer than the channel coherence time, $T_c$, the channel has already changed and the CREs are no longer correlated. From a comparison of the simulations performed, it is clear that the useful antenna separation distance is bounded by both an upper and lower limit. If the distance is too small, the spatial correlation between the CREs are Antenna A and Antenna B is too high and leads to too many erroneous estimates. On the other hand, when the distance too large, the time it takes Antenna B to reach a position previously occupied by Antenna A becomes longer than the coherence time of the channel and the CREs can no longer be meaningfully cross-correlated. The usable range appears to be approximately 5 cm-30 cm. The correlation threshold must also be adjusted accordingly—a high threshold for low separation and a lower threshold for higher separation distances.

5 CONCLUSION

This paper presents a simple adaptive speed estimation algorithm that is capable of producing high resolution estimates within a given range. Convergence time is typically less than 0.5 s and estimates at typical pedestrian speeds have an error of less than 1%. The scheme utilizes relative RF signature matching and hence does not require a priori information regarding the environment (no large databases of exact channel estimates are required). Also, no additional hardware would be required since future wireless devices are expected to be MIMO capable.

Finding optimum values for the antenna separation and threshold will be the focus of further research. A hardware prototype is planned and is currently in development.

Acknowledgment

The authors would like to thank Dr. Sinan Sinanovic (International University Bremen[†]) for his invaluable comments.

[†]Jacobs University Bremen as of spring 2007.

REFERENCES

[1] J. Collin, O. Mezentsev, and G. Lachapelle, "Indoor Positioning System Using Accelerometry and High Accuracy Heading Sensors," in *Proceedings of GPS/GNSS 2003 Conference*. Portland, Oreg.: Institute of Navigation, Sep. 9-12, 2003.

[2] J. Kappi, J. Syrjarinne, and J. Saarinen, "MEMS-IMU based pedestrian navigator for handheld devices," in *Proceedings of GPS/GNSS 2001 Conference*. Salt Lake City, Utah: Institute of Navigation, Sep. 11-14, 2001, pp. 1369-1373.

[3] C. Randell, C. Djiallis, and H. Muller, "Personal position measurement using dead reckoning," *Proceedings of the Seventh IEEE International Symposium on Wearable Computers* 2003, pp. 166-173, Oct. 18-21, 2005.

[4] A. Abdi and M. Kaveh, "Level crossing rate in terms of the characteristic function: a new approach for calculating the fading rate in diversity systems," *IEEE Transactions on Communications*, vol. 50, no. 9, pp. 1397-1400, September 2002.

[5] L. Zhao and J. W. Mark, "Mobile speed estimation based on average fade slope duration," *IEEE Transactions on Communications*, vol. 52, no. 12, pp. 2066-2069, December 2004.

[6] R. Narasimhan and D. C. Cox, "Speed estimation in wireless systems using wavelets," *IEEE Transactions on Communications*, vol. 47, no. 9, pp. 1357-1364, September 1999.

[7] I. T. Nabney, *Netlab: Algorithms for Pattern Recognition*, ser. Advances in Pattern Recognition. Springer-Verlag, 2002.

[8] R. B. Ertel, P. Cardieri, K. W. Sowerby, T. S. Rappaport, and J. H. Reed, "Overview of spatial channel models for antenna array communication systems," *IEEE [see also IEEE Wireless Communications] Personal Communications*, vol. 5, no. 1, pp. 10-22, February 1998.

[9] P. Höher, "A statistical discrete-time model for the WSSUS multipath channel," *IEEE Transactions on Vehicular Technology*, vol. 41, no. 4, pp. 461-468, November 1992.

[10] T. S. Rappaport, *Wireless communications*. Prentice Hall, 1996.

[11] European Broadcasting Union, "Digital Video Broadcasting (DVB); Framing structure, channel coding and modulation for digital terrestrial television," ETSI EN 300 744 v1.5.1 (2004-06), June 2004.

The following is shown in FIGS. 16 to 22:

FIG. 16 Multipath channel in time and space simulated for a carrier frequency of 474 MHz (DVB-T) and a speed of 1.5 $ms^{-1}$. After t seconds, Antenna B is where Antenna A was and sees the same channel response that Antenna A saw t seconds ago. As the distance, d, between the antennae is known, the speed is easily estimated as v=d/t.

FIG. 17 Two-antenna speed estimator setup.

FIG. 18 Buffers to hold channel response estimates for Antenna A and Antenna B.

FIG. 19 Speed estimation algorithm. "dbA[ ]" is the CRE buffer associated with Antenna A. The function xcorr (a, b, L) provides the normalized cross correlation product at lag=L (i.e. it performs the operations necessary to compute the parenthesized expression in (7)).

FIG. 20 MATLAB simulation of one-dimensional & unidirectional speed estimation algorithm. The threshold and the antenna separation are set to 0.8 and 15 cm respectively. Estimation error at a real speed of 1.5 $ms^{-1}$ is approximately 0.7%.

FIG. 21 MATLAB simulation of one-dimensional & unidirectional speed estimation algorithm. The threshold and the antenna separation are set to 0.7 and 30 cm respectively. Estimation error at a real speed of 1.5 $ms^{-1}$ is approximately 0.23%.

FIG. 22 MATLAB simulation of one-dimensional & unidirectional speed estimation algorithm. The threshold and the antenna separation are set to 0.6 and 60 cm respectively.

What is claimed is:

1. Method of determining the speed of a moving entity carrying at least two antennas for receiving a transmission signal, said antennas being displaced at a predetermined distance, comprising the steps of:
    receiving a transmission signal by the at least two antennas from any angle of arrival,
    determining signal characteristics from the transmission signal as received by the at least two antennas,
    determining a time offset between the reception of the transmission signal at the at least two antennas by comparing the signal characteristics determined for the at least two antennas, and
    determining the speed of the moving entity from the determined time offset, the distance of the at least two antennas and the direction of movement of the moving entity relative to the arrangement of the at least two antennas.

2. Method as claimed in claim 1, wherein the moving entity carries two antennas, arranged along a line parallel to the direction of regular movement of said moving entity, wherein for each antenna signal characteristics are determined from the received transmission signal and wherein the determined signal characteristics are compared to determine said time offset.

3. Method as claimed in claim 1, wherein the moving entity carries a plurality of antennas, arranged in a common plane or a common sphere, wherein for each antenna signal characteristics are determined from the received transmission signal and wherein the signal characteristics are compared to determine the time offsets between the reception of the transmission signal at the plurality of antennas.

4. Method as claimed in claim 3, wherein said antennas are arranged at the corners of a polygon having equally long side lengths, at equal distances along the circumference of a circle or equi-spaced on the surface of a sphere.

5. Method as claimed in claim 3, wherein the direction of movement of the moving entity relative to the arrangement of the at least two antennas is determined from the differences of time offsets determined for the plurality of antennas.

6. Method as claimed in claim 1, wherein the comparison of the signal characteristics is performed continuously.

7. Method as claimed in claim 1, wherein signal characteristics determined from a portion of the signal as received by the antenna located foremost in movement direction are stored as reference characteristics and wherein the same signal characteristics are determined from the transmission signals received by the other antennas and compared to the reference characteristics to determine the time offset(s).

8. Method as claimed in claim 1, wherein said signal characteristics are an envelope signal, amplitude peak values, energy values, delay, multipath delay characteristics, maximum delay, root-means-square (RMS) of delay, maximum Doppler frequency, Doppler spectrum or spectral characteristics of the transmission signal.

9. Method as claimed in claim 1, wherein an envelope signal is determined as signal characteristic from the transmission signal as received by the at least two antennas and used for determining the time offset between the reception of the transmission signal at the at least two antennas by comparing the envelope signals determined for the at least two antennas.

10. Method as claimed in claim 9, wherein at least a portion of the envelope signal determined from the transmission signal received by the antenna located foremost in a movement direction is stored as a reference portion and the other envelope signals are compared to this reference portion to determine the time offset(s).

11. Method as claimed in claim 1, wherein the signal characteristics are compared using a pattern or signal matching method.

12. Method as claimed in claim 1, wherein the direction of movement of the moving entity relative to the arrangement of the at least two antennas is determined by use of a navigation system or an acceleration sensor.

13. Method as claimed in claim 1, wherein the at least two antennas are aligned with the direction of movement of the moving entity.

14. Method as claimed in claim 1, wherein said at least two antennas are identical.

15. Method as claimed in claim 1, wherein said at least two antennas are adapted for receiving transmission signals, in particular of a GSM, UMTS, WiMax, WiFi system, or of a digital broadcast system, in particular a DVB-T system.

16. Method as claimed in claim 1, wherein the moving entity is a mobile phone, a navigation system, a computer, a PDA, a vehicle or a piece of clothing.

17. Method as claimed in claim 1, comprising the steps of:
determining one or more channel frequency response signals based on the received transmission signal by the antenna located foremost in movement direction,
storing said one or more channel frequency response signals by at least one of the antennas, which are not located foremost in movement direction,
determining a current channel frequency response signal based on the received transmission signal, and
correlating the current channel frequency response signal with at least one of the stored channel frequency response signals to determine said time offset.

18. Device for determining the speed of a moving entity comprising:
at least two antennas for receiving a transmission signal from any angle of arrival, said antennas being carried by said moving entity and displaced at a predetermined distance,
signal characteristics determination means for determining signal characteristics from the transmission signal as received by the at least two antennas,
time offset determination means for determining a time offset between the reception of the transmission signal at the at least two antennas by comparing the signal characteristics determined for the at least two antennas, and
speed determination means for determining the speed of the moving entity from the determined time offset, the distance of the at least two antennas and the direction of movement of the moving entity relative to the arrangement of the at least two antennas.

19. A device for determining the speed of the moving entity as defined in claim 18, wherein the moving entity comprises a mobile phone, navigation system, computer, a PDA, a vehicle or a piece of clothing.

20. Computer program for determining the speed of a moving entity carrying at least two antennas for receiving a transmission signal, said antennas being displaced at a predetermined distance, said computer program comprising program code means for causing a computer to carry out the following steps when said computer program is run on a computer:
determining signal characteristics from the transmission signal as received by the at least two antennas from any angle of arrival,
determining a time offset between the reception of the transmission signal at the at least two antennas by comparing the signal characteristics determined for the at least two antennas, and
determining the speed of the moving entity from the determined time offset, the distance of the at least two antennas and the direction of movement of the moving entity relative to the arrangement of the at least two antennas.

* * * * *